(12) United States Patent
Barrett et al.

(10) Patent No.: US 7,937,386 B2
(45) Date of Patent: May 3, 2011

(54) SYSTEM, METHOD, AND APPARATUS FOR INFORMATION EXTRACTION OF TEXTUAL DOCUMENTS

(75) Inventors: Leslie A. Barrett, New York, NY (US); Morton D. Mackof, New York, NY (US)

(73) Assignee: Complyon Inc., New York, NY (US)

( * ) Notice: Subject to any disclaimer, the term of this patent is extended or adjusted under 35 U.S.C. 154(b) by 317 days.

(21) Appl. No.: 12/346,117

(22) Filed: Dec. 30, 2008

(65) Prior Publication Data
US 2010/0169309 A1 Jul. 1, 2010

(51) Int. Cl.
*G06F 17/30* (2006.01)
(52) U.S. Cl. .................................. 707/713; 707/769
(58) Field of Classification Search .......... 707/713–718, 707/723, 728–737, 749, 750, 741–745, 769–771, 707/776
See application file for complete search history.

(56) References Cited

U.S. PATENT DOCUMENTS

| | | | |
|---|---|---|---|
| 5,309,359 A | 5/1994 | Katz et al. | |
| 6,295,529 B1 * | 9/2001 | Corston-Oliver et al. | 707/715 |
| 7,127,208 B2 | 10/2006 | Burstein et al. | |
| 7,143,091 B2 | 11/2006 | Charnock et al. | |
| 7,324,936 B2 | 1/2008 | Saldanha et al. | |
| 2006/0206464 A1 * | 9/2006 | Marukawa | 707/3 |
| 2007/0106644 A1 * | 5/2007 | Minerley | 707/3 |
| 2008/0027933 A1 | 1/2008 | Hussam | |
| 2008/0119953 A1 * | 5/2008 | Reed et al. | 700/94 |
| 2008/0154883 A1 * | 6/2008 | Chowdhury et al. | 707/5 |

OTHER PUBLICATIONS

A New Indexing Technique for Information Retrieval Systems Using Rhetorical Structure Theory (RST), M. Shoaib and A.A. Shah, Journal of Computer Science 2(3):224-228, 2006.
An Introduction to Rhetorical Structure Theory (RST), Bill Mann, Aug. 1999, downloaded from www.di.uniba.it.
Inter-dimensional Hypermedia Communicative Devices for Rhetorical Structure, Rutledge, et al., proceedings of the International Conference on Multimidia Modeling, 2000.
Rhetorical Structure Theory for Content-Based Indexing and Retrieval of Web Documents, F. Marir and K. Haouam, Second International Conference on IT: ITRE, 2004, Research and Education.

* cited by examiner

*Primary Examiner* — Wilson Lee
(74) *Attorney, Agent, or Firm* — Gordon & Jacobson, PC

(57) ABSTRACT

A method and system for text extraction employs structured annotations that are embedded within a text document and specify the start and end of a document segment and an associated rhetorical relation. The structured annotations are processed to generate and store variables that represent document segments and associated rhetorical relations. A user interacts with a computer to define query input that specifies at least one rhetorical relation of interest. The query input is processed to query the stored variables to identify document segments associated with a rhetorical relation that matches the rhetorical relation of interest and to return to the user information pertaining to the matching document segments. The rhetorical relation of interest as well as the stored variables can include RST relations whose meaning is dictated by nuclearity of the associated text as well as Speech Act relations whose meaning extends beyond the situational semantics of the associated text.

32 Claims, 15 Drawing Sheets

Database Access Logic

FIG. 5B1
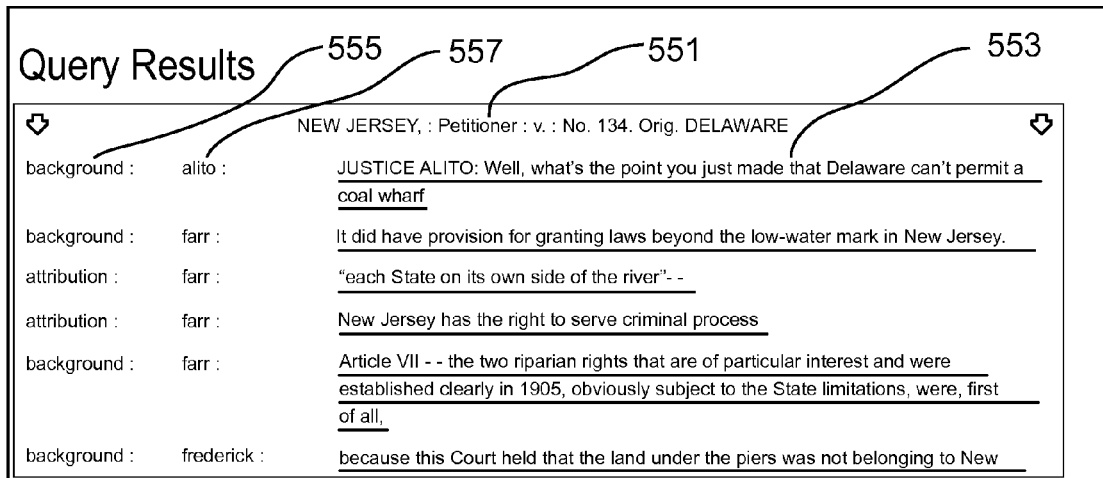
FIG. 5B2
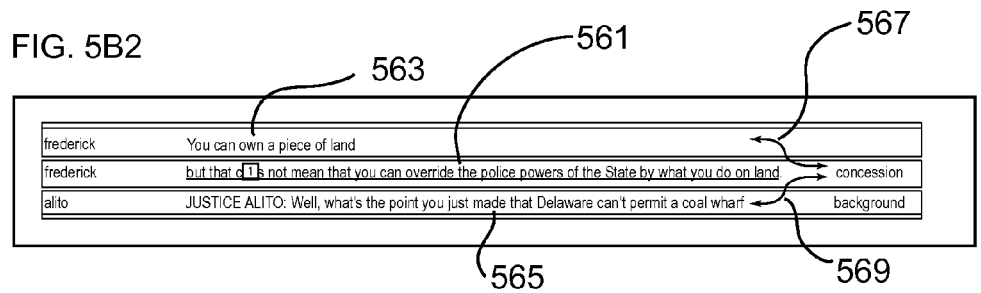
FIG. 5B3
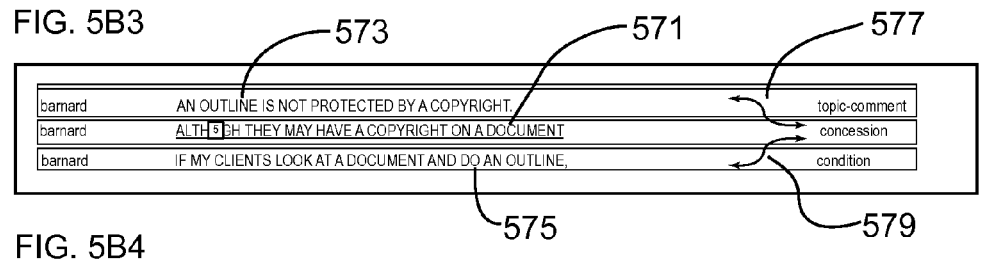
FIG. 5B4
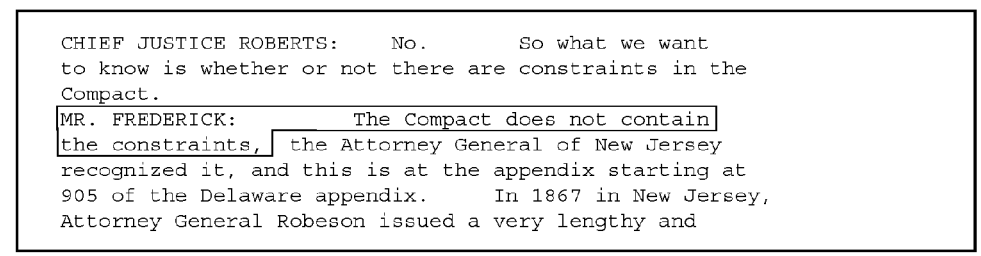

FIG. 6A

Segment Tag

- segment ID
- start of segment
- end of segment
- Other attributes for segment (optional)

FIG. 6B

Span Tag

- segment ID
- start of segment
- end of segment
- span ID
- Span Relation Type
{dictates a grouping of the segment defined by the segment ID/ start of segment and end of segment and all related segments or spans (related by one or more Mononuclear RST Tags) and all related MNN Nodes (related by one or more Multinuclear RST Tags) into a span denoted by the span ID}
- Actor Name for span (optional)
- Actor Role for span (optional)
- Other attributes for span (optional)

FIG. 6C

Mononuclear RST Tag

- Nucleus Segment ID (or Nucleus Span ID or Nucleus MNN ID)
- Satellite Segment ID (or Satellite span ID or Satellite MNN ID)
- RST Relation Type for Normal RST relation
{dictates a mononuclear RST relation between the Nucleas segment (or Nucleus span or Nucleus MNN) and the Satellite segment (or Satellite span or Satellite MNN}

FIG. 6D

Multinuclear RST Tag

- Segment ID (or Span ID)
- Multinuclear Node (MNN) ID
- RST Relation Type for Multinuclear RST relation
{dictates joining of the segment (or span) to the MNN denoted by the MNN ID -- used to join segments or spans as part of the MNN node}

FIG. 6E

Speech Act Tag

- Segment ID (or Span ID)
- Speech Act Relation Type
{dictates a Speech Act relation for the segment or span}

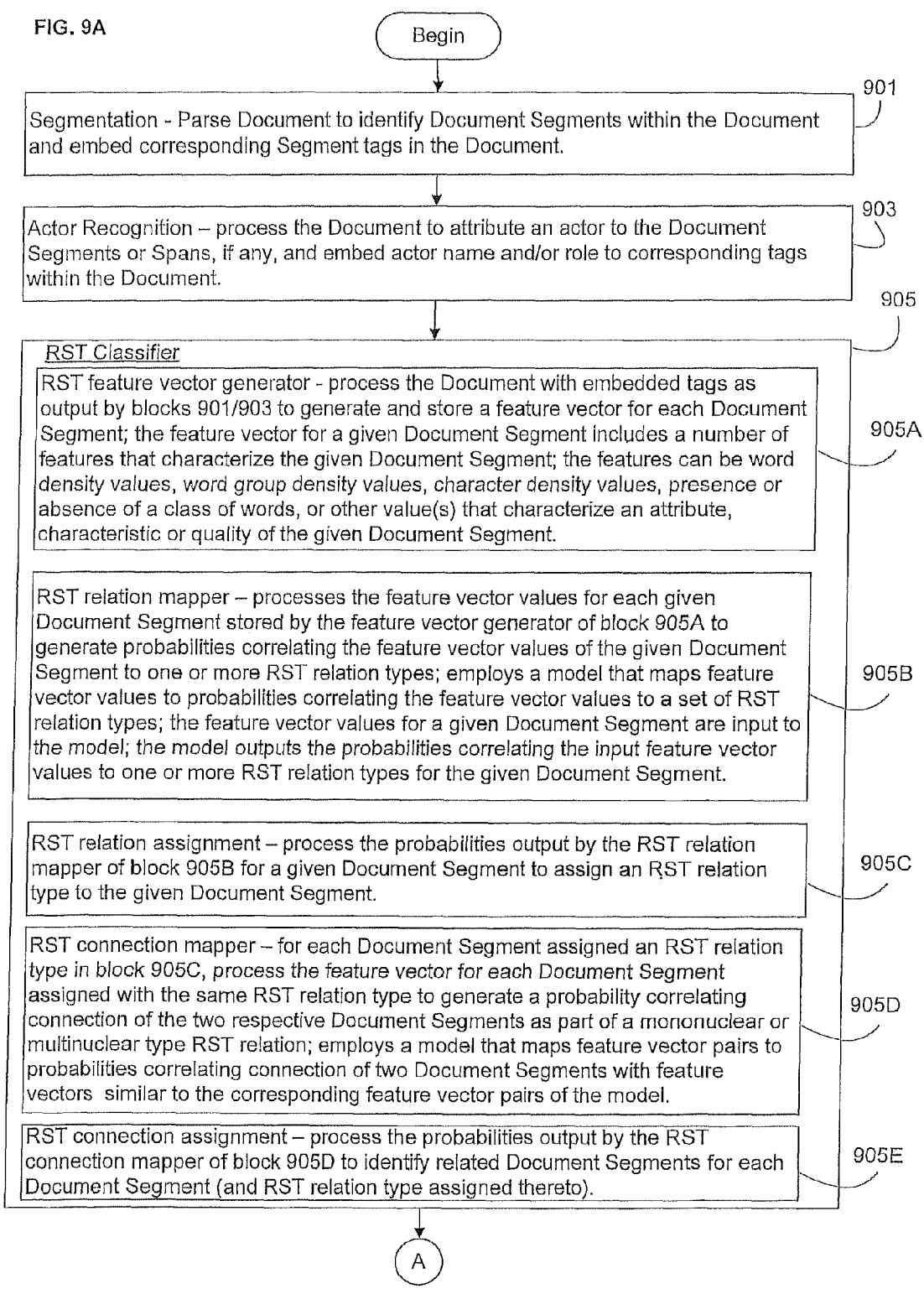

SYSTEM, METHOD, AND APPARATUS FOR INFORMATION EXTRACTION OF TEXTUAL DOCUMENTS

BACKGROUND OF THE INVENTION

This invention relates broadly to methods and systems for extraction of text from documents. More particularly, this invention relates to methods and systems for tagging documents with annotations and for extracting text from documents using such annotations.

There are many domains where users search a large number of text documents and/or one or more large text documents for content of interest. Such domains include legal research and analysis as well as scientific research and analysis.

SUMMARY OF THE INVENTION

The present invention provides a methodology, system and apparatus for extraction of text from a set of text documents in an efficient and accurate manner.

In accordance with the present invention, a document is annotated with embedded tags corresponding to document segments therein by identifying a plurality of document segments within a given text document. For each document segment, at least one structured annotation is embedded within the document and associated with the given segment. The structured annotation specifies the start and end of the given document segment and a rhetorical relation associated with the given segment. The structured annotations are processed generate a plurality of variables that represent document segments and associated rhetorical relations as specified by the structured annotations, and such variables are stored in a data repository.

A user interacts with a computer to define query input that specifies at least one rhetorical relation of interest. The query input specified by the user is processed to query the variables stored in the data repository to identify zero or more document segments that are associated with a rhetorical relation that matches the at least one rhetorical relation of interest specified by the query input. Information corresponding to the zero or more matching document segments is returned to the user.

In the preferred embodiment, the rhetorical relations represented by the user supplied query input as well as the variables stored in the data repository include a set of RST relations whose meaning is dictated by nuclearity of the associated text. Such RST relations can include a plurality of mononuclear RST relations each having a nucleus and a satellite and a plurality of multinuclear RST relations each having a plurality of nucleus. The rhetorical relations represented by the user supplied query input as well as the variables stored in the data repository can also include a set of Speech Act relations whose meaning extends beyond the situational semantics of the associated text.

The structured annotations embedded in a given document can be derived from expert analysis of the given document preferably with the assist of a computer-based markup tool or though automated means as described herein.

It will be appreciated that the methodology, system and apparatus of the present invention provide for extraction of text from a set of text documents in an efficient and accurate manner suitable for a range of expert domains, which include for example, legal research and analysis, scientific research and analysis, and journalist research and analysis, financial research and analysis, business research and analysis, FDA Administrative Panel, transcript research, job interviewing as an indicator of future success, interrogation evaluation, etc.

Additional objects and advantages of the invention will become apparent to those skilled in the art upon reference to the detailed description taken in conjunction with the provided figures.

BRIEF DESCRIPTION OF THE DRAWINGS

FIGS. 5B1, 5B2, 5B3 and 5B4 are schematic illustrations of exemplary graphical user interfaces that are part of the operations of FIG. 5A.

FIG. 6A is a schematic diagram of an exemplary segment tag in accordance with the present invention.

FIG. 6B is a schematic diagram of an exemplary span tag in accordance with the present invention.

FIG. 6C is a schematic diagram of an exemplary mononuclear RST tag in accordance with the present invention.

FIG. 6D is a schematic diagram of an exemplary multinuclear RST tag in accordance with the present invention.

FIG. 6E is a schematic diagram of an exemplary speech act tag in accordance with the present invention.

FIGS. 9A and 9B, collectively, is a flow chart illustrating exemplary automated document annotation operations carried out by the system of FIG. 1 in accordance with the present invention.

DETAILED DESCRIPTION

For purposes of description herein, a Document is one or more digital files that contain textual content. The digital file(s) of the Document can contain other types of information, such as images, video, audio, charts or graphs, spreadsheet data, etc. Examples of Documents include plain text files, word processing files, text-based HTML file(s), and text-based XML file(s). A Document can be part of a large and structured set of texts referred to herein as a Corpus. A Document can be logically partitioned into one or more portions, which are referred to herein as Document Segments.

The textual content contained in a Document can be attributed to an author for written text, such as a book, article, paper, web page, blog, court opinion, presentations and earnings reports, and other written text sources. Alternatively, the textual content contained in a Document can be attributed to a speaker for spoken words transcribed into text, such as in a hearing transcript, deposition transcript, trial transcript, legislative transcript, event or show transcript, and other sources where spoken words are transcribed into text. Such authors and speakers are referred to collectively herein as Actors. Such Actors can be carrying out particular Roles that are relevant to the situations that encompass the textual content of the document. An example of common Roles are "Judge," "Attorney," "JuryForeman" for Actors in a court proceeding transcript. "Deponent," "Attorney," and "CourtReporter" are common Roles for Actors in a deposition transcript. "Customer" and "Agent" are common Roles for Actors in a customer service interaction transcript. "Hiring Manager" and "Job Candidate" are common roles for Actors in a job interview. "Investigator" and "Detainee" are common roles for Actors in a law enforcement interrogation transcript.

Figure 1:
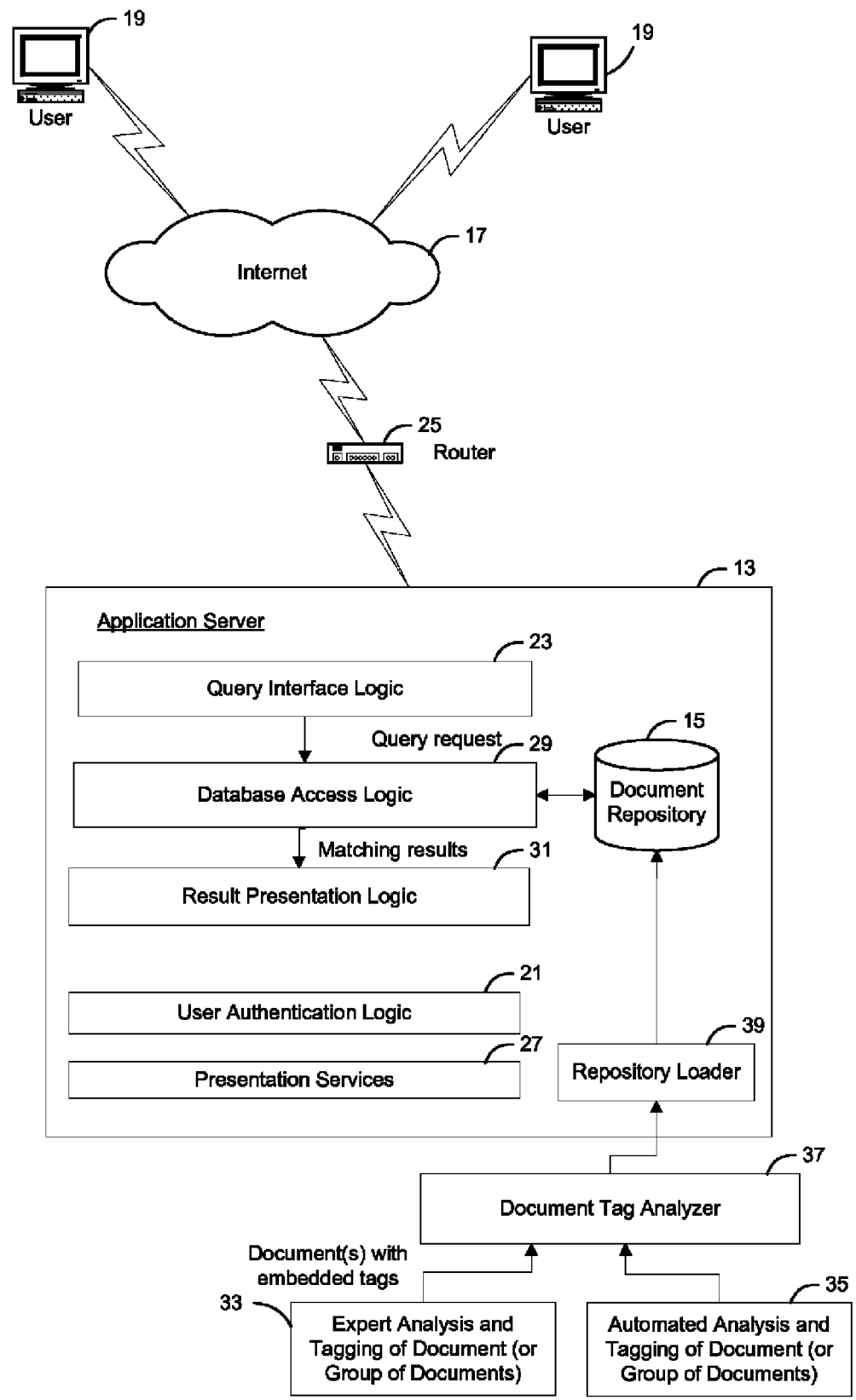
FIG. 1 is a functional block diagram of a system for information extraction of text document in accordance with the present invention

Turning now to FIG. 1, there is shown the architecture of a web-based information extraction system 11 in accordance with the present invention. The present invention employs an ontology that represents rhetorical relations associated with Document Segments. The ontology includes relation variables that correspond to a predetermined set of rhetorical relations associated with Document Segments. In the preferred embodiment, the rhetorical relations of the ontology are derived from Rhetorical Structure Theory (RST) and/or Speech Act Theory as described below in more detail. The relation variables are linked to Document Segments as part of a document repository 15 maintained by an Application Server 13. Users of the system access the Application Server 13 over a network 17 (such as the Internet) to interact with the Application Server 13 to generate and submit query requests that specify one or more rhetorical relations of interest as well as other parameters. The Application Server 13 maps each query request to a set of query filters (e.g., database retrieval commands) that are matched to the relation variables stored in the document repository 15 to identify a set of document segments that match the query filters. Information regarding the matched document segments for a given query request, such as a list of links to the matched document segments, is visually presented to the user that specified the given query request.

The Users utilize a web browser executing on a computing device 19 to connect to the Application Server 13 over the network 17 (e.g., Internet). Preferably, the browser-based interaction between the computing devices 19 and the Application Server 13 occur over TCP/IP sessions established therebetween over which are communicated HTML-based (and possibly XML-based) documents and commands as well as other messages, commands and data. The Application Server 13 includes user authentication logic 21 that enables login and authentication of the User. Such login and authentication can utilize password-based authentication, operating system-based authentication (e.g., NTLM or Kerberos); services-based authentication (e.g., Microsoft Passport authentication), certificate-based authentication, or any other authentication scheme. Once a user session has been authorized, the Application Server 13 invokes the Query Interface Logic 23.

Query Interface Logic 23 interacts with the user to generate and submit query requests that specify one or more rhetorical relations of interest as well as other parameters. In the preferred embodiment, the rhetorical relations are derived from Rhetorical Structure Theory (RST) and/or Speech Act Theory as described below in more detail. Such interaction is carried out by serving web page(s) to the User web browser and receiving data supplied by the User web browser to the Application Server 11. Preferably, the Application Server 13 is coupled to the network 17 by a firewall/router 25 that enables authorized communication between the user devices 19 and the Application Server 13, while blocking unauthorized communication requests to the Application Server 13. The Query Interface Logic 23 preferably includes a commercially available HTTP server, such as the Apache Web Server, Microsoft Internet Information Server, and Sun ONE Web Server for serving the web page(s) to the User web browser in accordance with HTTP requests issued by the User web browser. The HTTP server preferably utilizes style sheets to build the HTML documents (and XML documents) for presentment to the User web browser as is well known.

The document repository 15 of the Application Server 13 stores relation variables. A relation variable is a data structure that identifies a particular rhetorical relation and links the particular rhetorical relation to one or more Document Segments. Database Access Logic 29 of the Application Server 13 processes the query requests generated by the Query Interface Logic 23 and maps each query request to a set of query filters (e.g., database retrieval commands) that are matched to the relation variables stored in the document repository 15 to identify a set of Document Segments that match the query filters.

Result Presentation Logic 31 of the Application Server 13 collects information regarding the matched Document Segments for a given query request, such as a list of links to the matched Document Segments, and visually presents such information to the user that specified the given query request.

The Query Interface Logic 23, Database Access Logic 29 and Result Presentation Logic 31 preferably cooperate with Presentation Services 27 of the Application Server 13. Presentation Services 27 are facilities for interfacing to the document repository 15 and for delivering content to user browsers. Preferably, the Presentation Services 27 provide CGI support as well as server-side scripting functionality, such as Active Server Pages, JavaServer pages, Perl scripting, PL/SQL scripting, etc.

In the preferred embodiment, the Application Server 13 is realized by a commercially-available software framework, such as the WebLogic Platform commercially available from BEA Systems of San Jose, Calif., the Websphere Application Server commercially available from IBM, Windows Server Systems commercially available from Microsoft Corporation of Redmond, Wash., or the SUN ONE Application Server commercially available from Sun Microsystems of Santa Clara, Calif.

Relation variables and other ancillary information stored in the document repository 15 are derived by a relation tagging process that embeds tags within a given Document. The embedded tags specify Document Segments and rhetorical relations that are associated therewith as well as ancillary information pertaining to the given Document. The tagging process can be carried out with the input of a trained operator in block 33 or by an automated process in block 35. A Document (including the tags embedded therein by blocks 33 or 35) is processed by a Document Tag Analyzer 37 that transforms the embedded tags of the Document to corresponding relation variables as well as ancillary data pertaining to the Document. Loader mechanism 39 loads the relation variables and ancillary data pertaining to the Document into the document repository 15 for access by logic 29. The loader mechanism 39 can operate in an online manner as the data is generated by the analyzer 37, on a Document-by-Document basis, on a batch basis over multiple Documents (such as multiple Documents belonging to a Corpus), or in some other suitable manner.

Figure 2A:
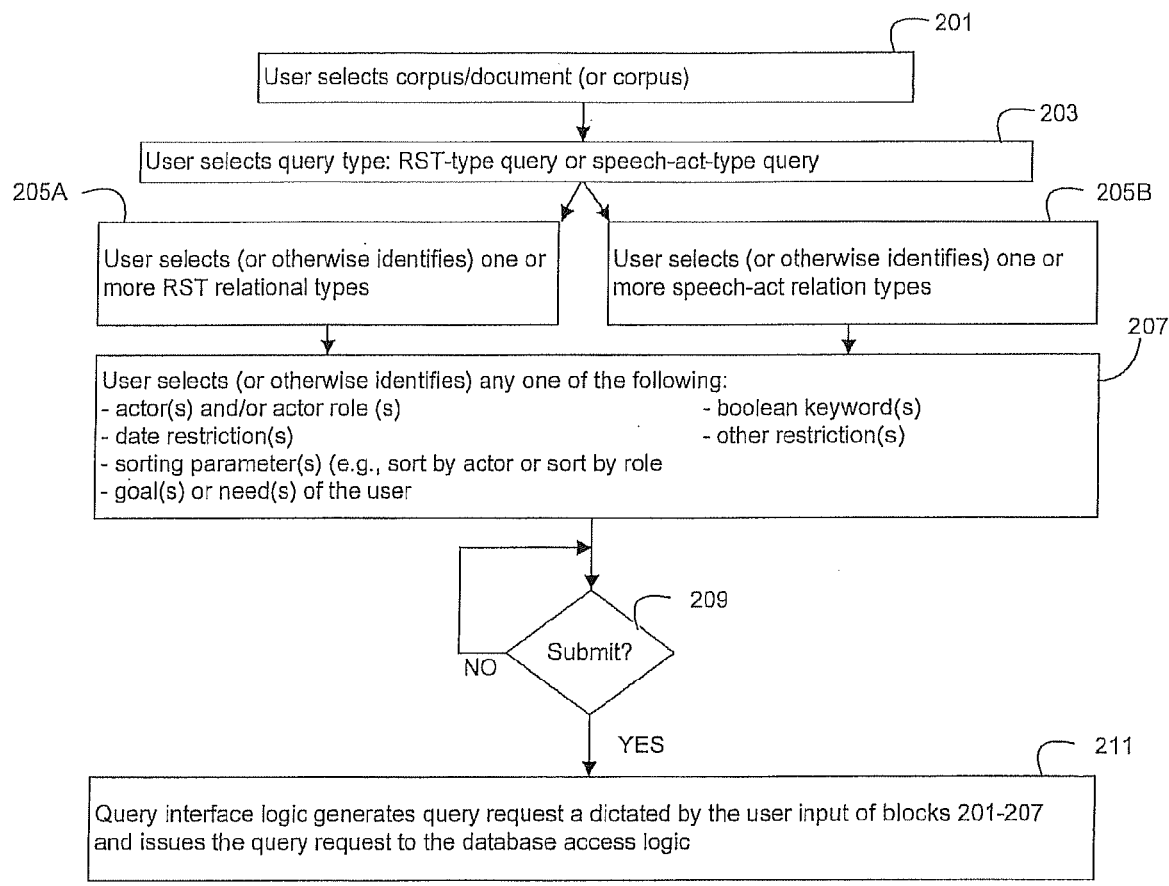
FIG. 2A is a functional block diagram of exemplary operations carried out by the Query Interface Logic of FIG. 1.

FIG. 2A is a flow chart depicting exemplary operations carried out by the Query Interface Logic 23 of FIG. 1. Such operations are carried out by serving web page(s) to the User web browser and receiving data supplied by the User web browser to the Application Server 11. In block 201, the user selects a Corpus from a list of Corpora (such as Court Type, District, etc.) as maintained by the document repository 15 as well as a Document from list of Documents maintained by the document repository 15. In block 203, the user selects a query type between an RST-relation-type query and a speech-act-relation-type query. If the user selects a RST-relation-type query, the operations continue to block 205A wherein the user selects (or otherwise identifies) one or more RST relational types as described herein. If the user selects a speech-act-relation-type query, the operations continue to block 205B wherein the user selects (or otherwise identifies) one or more Speech Act relational types as described herein. In block 207, the user can select (or otherwise identify one or more other parameters for specifying a query. Such parameters can include one or more Actors or Roles, date restrictions, sorting parameters, goals or needs of the user, boolean keywords or other restrictions. In block 209, the operations wait for the user to submit the query specified by the input in blocks 201 to 207 and then continues to block 211 wherein the Query Interface Logic 23 generates a query request which represents the user input of blocks 201 to 207 and issues the query request to the Database Access Logic 29.

Figure 2B:
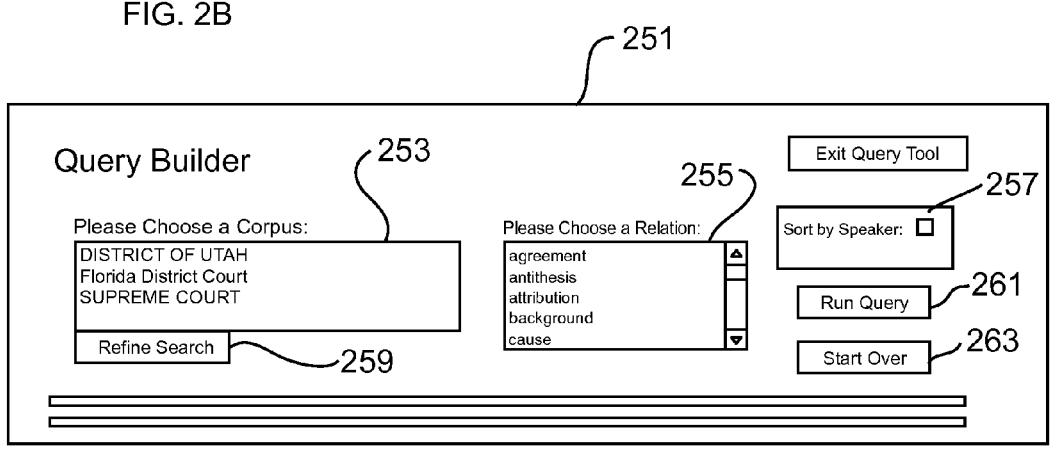
FIG. 2B is a schematic illustration of an exemplary user interface that is part of the operations of FIG. 2A.

FIG. 2B illustrates an exemplary user interface generated by the Query Interface Logic 23 as part of the operations of FIG. 2A. It is assumed that the interface 251 includes a selector box 253 that allows the user to select a corpus from a list of Corpora (block 201) as well as a selector box 255 that allows the user to select one or more particular RST relation types from a list of RST relation types supported by the system (block 205A). A similar selector box (not shown) can be used to allow the user to select one or more particular Speech Act relation types from a list of Speech Act relation types supported by the system (block 205B). A check box 257 is provided to allow the user to specify that the search results should be sorted by actor, referred to a "sort by speaker" in FIG. 2B (block 207). A button 259 leads to an additional interface screen (not shown) that allows the user to specify other search parameters, such as date restrictions, other sorting parameters, boolean keywords, goal or needs of the user, etc. (block 207). After defining the query parameters, the user submits the query by clicking on button 261 (block 209). Before submission, the user can start over defining the query at any time by clicking on button 263.

Figure 3:
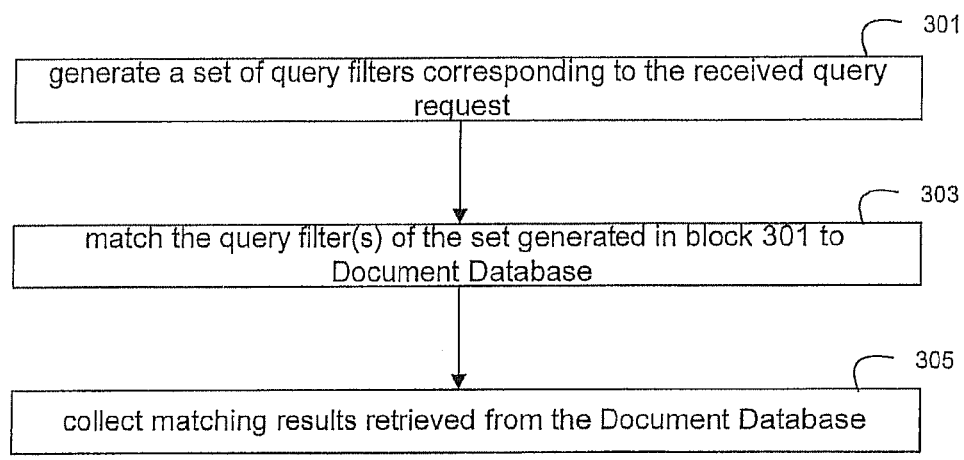
FIG. 3 is a functional block diagram of exemplary operations carried out by the Database Access Logic of FIG. 1.

FIG. 3 is a flow chart depicting exemplary operations carried out by the Database Access Logic 29 of FIG. 1. In block 301, the Database Access Logic 29 generates a set of query filters (e.g., database retrieval commands) corresponding to a received query request. Such query filters can include SQL commands as is well know in the computer arts or other suitable database retrieval command structures. In block 303, the query filters of the set generated in block 301 are queried against the document repository to identify Document Segments that match the query filters of the set. Such query operations identify the zero or more Document Segments stored in the document repository that are linked or otherwise associated with a rhetorical relation that matches the one or more RST relation types or speech act relation types specified by the user and encoded in the received query request. In block 305, the matching Document Segments identified in block 305 are collected for output to the Result Presentation Logic 31.

Figure 5A:
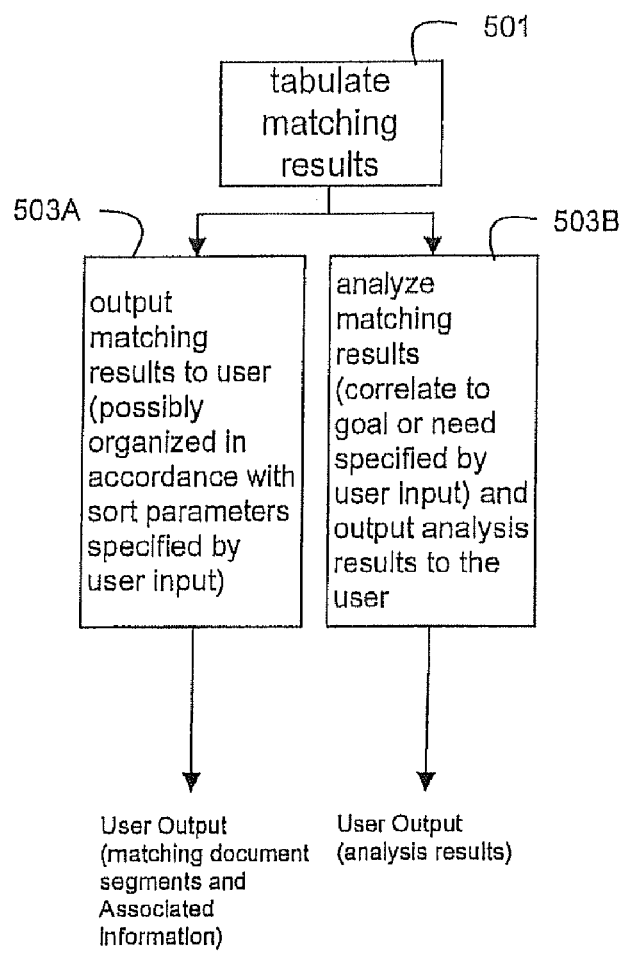
FIG. 5A is a functional block diagram of exemplary operations carried out by the Result Presentation Logic of FIG. 1.

FIG. 5A is a flow chart depicting exemplary operations carried out by the Result Presentation Logic 31 of FIG. 1. In block 501, the Result Presentation Logic 31 tabulates the matching Document Segments output from the Database Access Logic 29. In block 503A, the Result Presentation Logic 31 presents information regarding the matched Document Segments for a given query request, such as a list of links to the matched Document Segments, to the user that specified the given query request. Such information is preferably presented to the user via one or more web pages that are communicated from the Application Server 13 to the user web browser for rendering thereon. The information regarding the matched Document Segments can be organized for presentation to the user in accordance with sorting parameters specified by user input in block 207 (i.e., sort by actor and/or sort by role). In block 503B, the Result Presentation Logic 31 can analyze the matched Document Segments (such as by correlating the matched Document Segments to a goal or need specified by user input in block 207) and present information regarding such analysis results to the user that specified the given query request. Such information is preferably presented to the user via one or more web pages that are communicated from the Application Server 13 to the user web browser for rendering thereon.

Figure 4:
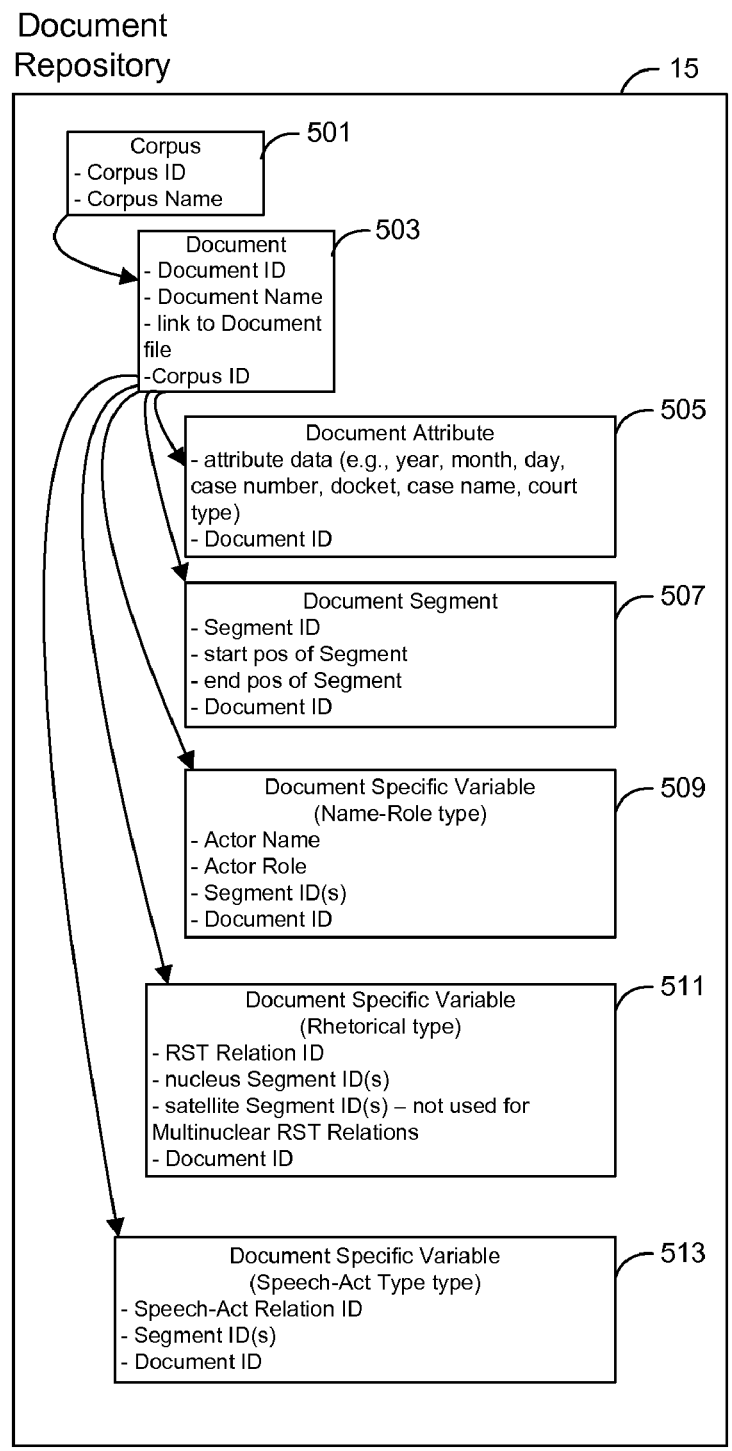
FIG. 4 is a schematic illustration of an exemplary embodiment of the document repository of FIG. 1 in accordance with the present invention.

FIGS. 5B1, 5B2, 5B3 and 5B4 illustrate exemplary user interfaces generated by the Result Presentation Logic 31 as part of the operations of FIG. 5A. In FIG. 5B1, the document name 551 is presented at the top of the screen, the matching document segments are presented as a list 553 with the corresponding relations 555 and speakers 557 to the left of each document segment of the list (block 503A). The document segments of the list are links to a corresponding screen that presents the document segment within the document itself (An example is shown in FIG. 5B4). The list 553 of document segments can be sorted by actor if requested by the user.

FIGS. 5B2 and 5B3 illustrate views that allow a user to identify one or more related document segments and to select and traverse to a particular document segment of interest. More specifically, a mouse over box that overlies a particular segment enables the user to view one or more document segments related to the particular segment (for example, one nucleus document segment and one satellite document segment related to that segment). The mouse over box provides a link that enables the user to traverse to the linked document segment. The user can click on the link to take the user to an html version of the document context with that particular segment highlighted as illustrated in FIG. 5B4.

In the view of FIG. 5B2, the mouse over box labeled 1 overlies document segment 561, which is connected by a "concession" relation to a previous document segment 563 presented thereabove as indicated by connection arrow icon 567. Document segment 561 is also connected to a subsequent document segment 565 presented thereunder as indicated by connection arrow icon 569. The mouse over box 1 provides a link upon mouse over that enables the user to traverse to an html version of the document context with the document segment 561 highlighted. The names of relations associated with the connected document segments 563 and 567 are also presented adjacent the connecting relation name as shown. In the example shown, the segment 565 is associated with a "background" relation, while segment 563 is not associated with another relation (i.e., it is a "head" relation as described below).

In the view of FIG. 5B3, the mouse over box labeled 5 overlies document segment 571, which is connected by a "concession" relation to a previous document segment 573 presented thereabove as indicated by connection arrow icon 577. Document segment 571 is also connected by the "concession" relation to a subsequent document segment 575 presented thereunder as indicated by connection arrow icon 579. The mouse over box 1 provides a link upon mouse over that enables the user to traverse to an html version of the document context with the document segment 571 highlighted.

Note that the connection of document segments by relations can be viewed as a hierarchical tree structure with nodes each corresponding to a particular document segment. In this manner, the views of FIGS. 5B2 and 5B3 display the document segments related to a particular node of the hierarchical tree structure. It is contemplated that the view can be expanded to present the related segments for adjacent nodes (segments) of the hierarchical tree structure and provide for linking to the document context for such nodes in a manner similar to that described above with respect to FIGS. 5B2 and 5B3. For example, the view of FIG. 5B3 can be expanded to present above document segment 573 a document segment that precedes the document 573 and is related thereto as well as below document segment 575 a document segment that follows document segment 575 and is related thereto. It is also contemplated that as part of formulating the query as described above with respect to FIG. 2A, the user can control the relevant depth (the number of connected nodes) of the hierarchical tree that is presented to the user as part of such result view generated by the Result Presentation Logic 31.

Note that in the case where there are no preceding document segments related to a given segment (in other words, the segment is the head of a tree), the presentation logic can be adapted to present to the user the immediately preceding segment above the "head" document segment, and no connection arrow icon is presented that depicts the connection of the preceding document segment to the "head" document segment. Similarly, in the case where there are no subsequent document segments related to a given segment (in other words, the segment is the foot of a tree), the presentation logic can be adapted to present to the user the immediately subsequent segment below the "foot" document segment, and no connection arrow icon is presented that depicts the connection of the "foot" document segment to the subsequent segment.

FIG. 4 is a schematic illustration of an exemplary embodiment of the document repository 15 of FIG. 1. The document repository 15 of FIG. 4 supports an ontology that represents rhetorical relations between Document Segments that are derived from Rhetorical Structure Theory (RST) as well as Speech Act Theory as described below in more detail. The document repository of FIG. 4 is realized by a relational database logically organized with a Corpus table 501, a Document table 503, a Document Attribute table 505, a Document Segment table 507, a Name-Role Variable table, a Rhetorical Document Specific Variable table 511, and a Speech Act Document Specific Variable table 513 as shown. The Corpus table 501 includes a Corpus ID and name for each Corpus maintained by the relational database. The Document table 503 stores a Document ID, a Document name, a file link (e.g., URL or path) to the one or more file(s) of the Document itself, and a Corpus ID for each Document maintained by the relational database. The Document Attribute table 505 stores attribute data and the Document ID for each Document maintained by the relational database. The attribute data can represent a date (year/month/day). It can also vary for different types of Documents. For legal Documents, such attribute data can include a case number, docket number, court type, etc. The Document Segment table 507 includes a segment ID, data that indicates the start and end of the Document Segment, and a Document ID for each Document Segment maintained by the relational database. The Name-Role Variable table 509 includes an Actor Name, an Actor Role (if used), one or more Document Segment IDs, and a Document ID for each document-specific Actor Name and Role maintained by the relational database. The Rhetorical Document Specific Variable table 511 includes a RST relation ID, one or more nucleus segment IDs, one or more satellite segment IDs (not used for Multinuclear RST relations) and a Document ID for each document-specific RST relation ID maintained by the relational database. The Speech Act Document Specific Variable table 513 includes a Speech Act relation ID, one or more segment IDs, and a Document ID for each document-specific Speech Act relation ID maintained by the relational database. The Corpus IDs are keys that are uniquely assigned to the Corpus maintained by the relational database and used by the relational database to link together the table entries that pertain to a particular Corpus. The Document IDs are keys that are uniquely assigned to the Documents maintained by the relational database and used by the relational database to link together the table entries that pertain to a particular Document. The segment IDs are keys that are uniquely assigned to Document Segments maintained by the relational database and used by the relational database to link together the table entries that pertain to a particular Document Segment.

Rhetorical Structure Theory (RST), which was developed by Mann & Thompson in 1988, defines relations that can be used in a top down recursive manner to relate parts and sub-parts of text. These parts and sub-parts of text are commonly referred to as spans. In ordinary usage, the spans of a text document have a kind of unity that arbitrary collections of sentences or other language generally lack. RST offers an explanation of the coherence of texts. But what is coherence? One formulation of coherence is that it is the absence of non-sequiturs and gaps. That is, for every part of a coherent text, there is some rhetorical function, some plausible reason for its presence, evident to readers, and furthermore, there is no sense that some parts are somehow missing. RST focuses on the first part—an evident rhetorical role for every part. RST is intended to describe texts, rather than the processes of creating or reading and understanding them. It posits a range of possibilities of structure—various sorts of rhetorical building blocks which can be observed to occur in texts. These rhetorical building blocks deal with "nuclearity" and "relations", which are often called coherence relations in the linguistic literature.

A central aspect of RST is the investigation of nuclearity in discourse, i.e. the asymmetries between the spans that make up a more complex structure by identifying nuclei and corresponding satellites in the text. A Nucleus is a span that more important to the purpose of the writer or speaker, less easy to substitute and more necessary for the understanding of the discourse. A Satellite, on the other hand, is a span that can be replaced without any significant change to the function of the text and has a meaning that depends on other elements. According to such nuclearity, two types of relations are used: mononuclear relations that relate a nucleus to a satellite, and multinuclear relations that relate several nuclei but not satellites.

The most frequent structural pattern is that two spans of text (which are typically adjacent to one another, but exceptions can be found) are related such that one of them has a specific role relative to the other. A paradigm case is a claim followed by evidence for the claim. RST posits an "Evidence" relation between the two spans. It also says that the claim is more essential to the text than the particular evidence, and this essentiality is represented by calling the claim span a nucleus and the evidence span a satellite. The order of spans is not constrained, but there are more likely and less likely orders for all of the relations.

The following describes mononuclear and multinuclear relations derived from RST theory that can be identified as part of RST tags in accordance with the present invention.

Agreement

In an AGREEMENT mononuclear relation, the statement made in the satellite affirms that of the nucleus either with a single affirmation or an affirmation and restatement of the nucleus.

Example:
JUSTICE SCALIA: So, obviously, the right to wharf out does not include the right to use the wharf for whatever you like, and the only thing we're arguing about is whether it is New Jersey or Delaware that can impose limitations. [<nucleus> But that it is subject to limitation is, it seems to me, absolutely clear.]
MR. FARR: [<satellite> I agree with that.]

Analogy

In an ANALOGY multinuclear relation, two or more nuclei are compared with each other along some dimension. This is common in legal documents where a previous decision or argument is raised in parallel to a topic currently under discussion.

Example:
[<nucleus> As in the Eleventh Circuit case of Roe,] [<nucleus> . . . states a cause of action for dilution.]

Antithesis

In an ANTITHESIS mononuclear relation, the situation presented in the nucleus comes in contrast with the situation presented in the satellite.

Example:
[<nucleus> Although the legality of these sales is still an open question,][<satellite> the disclosure couldn't be better timed to support the opposing position . . . ].

Background

In a BACKGROUND mononuclear relation, the satellite establishes the context or the grounds with respect to which the nucleus is to be interpreted. Understanding the satellite helps the recipient understand the nucleus. The satellite IS NOT the cause/reason/motivation of the situation presented in the nucleus.

Example:
MR. FREDERICK: [<satellite> The Compact does not contain the constraints, the Attorney General of New Jersey recognized it and this is at the appendix starting at 905 of the Delaware appendix.]
<nucleus> The Compact Cause In a CAUSE mononuclear relation, the situation presented in the nucleus is the cause of the situation presented in the satellite. The cause, which is the nucleus, is the most important part. The satellite represents the result of the action.

Example:
JUSTICE STEVENS: [<nucleus> Even if—even if the building of the wharf interfered with the navigation on the river?]
MR. FARR: [<satellite> Well, this is, I think, why I was trying to separate it into two parts.]

Circumstance

In a CIRCUMSTANCE mononuclear relation, the situation presented in the satellite provides the context in which the situation presented in the nucleus should be interpreted. The satellite IS NOT the cause/reason/motivation of the situation presented in the nucleus.

Example:
[<satellite> As previously reported,][<nucleus> a member of the Philippines' House of Representatives has sued to stop the plant.]

Comment

In a COMMENT mononuclear relation, the satellite constitutes a subjective remark on the nucleus. It is not an evaluation or an interpretation.

Example:
JUSTICE SOUTER: : [<nucleus> I want to know whether Delaware would prevail when it got here—in your view?]
MR. FREDERICK: [<satellite> I don't think that Delaware would prevail on a blanket prohibition of the exercise of riparian rights by New Jersey landowners.]

Comparison

In a COMPARISON multinuclear relation, multiple nuclei are compared along some dimension, which can be abstract. The relations can convey that some abstract entities that pertain to the comparison relation are similar, different, greater-than, less-than, etc.

Example:
JUSTICE ALITO: [<nucleus> Is it simply to authorize it to be disturbed to the extent necessary to construct a wharf,][<nucleus> or does it go any further than that?]

Concession

In a CONCESSION mononuclear relation, the situation indicated in the nucleus is contrary to expectation in the light of the information presented in the satellite. In other words, a CONCESSION relation is always characterized by a violated expectation.

Example:
[<satellite> Although the 1905 Compact between Delaware and New Jersey did not settle the boundary dispute between them],
[<nucleus> New Jersey nevertheless agreed to dismiss the suit that it had filed before this Court to determine the boundary].

Conclusion

In a CONCLUSION mononuclear relation, the satellite presents a final statement that wraps up the situation presented in the nucleus. A CONCLUSION satellite is a reasoned judgment, inference, necessary consequence, or final decision with respect to the situation presented in the nucleus. An "if-then" statement tends to be a good indicator of a conclusion.

Example:
And if [<nucleus> New Jersey has that power], [<satellite> it must have been a power that was intended in the 1905 Compact].

Condition

In a CONDITION mononuclear relation, the truth of the proposition associated with the nucleus is a consequence of the fulfillment of the condition in the satellite. The satellite presents a situation that is not realized.

Example:
[<nucleus> S. A. brewing would make a takeover offer for all of Bell Resources][<satellite> if it exercises the option,]

Condition-Contrary

In a CONDITION-CONTRARY mononuclear relation, truth of the proposition associated with the nucleus is a consequence of the non-fulfillment of the condition in the satellite, and the condition expresses a statement that is contrary to fact. The satellite presents a situation that cannot be realized.

Example:
[<satellite> if, now, Delaware had proposed at the time that, instead of the language as it is now, at the end of Article VII the words were added "subject to the police power of the other State"]

[<nucleus> New Jersey obviously would have had the reaction to that that is something that depends on the boundary].

Consequence-N

In a CONSEQUENCE-N mononuclear relation, the situation presented in the nucleus is a consequence or result of the situation presented in the satellite. The reader/writer intentions are irrelevant to determining whether such a relation holds. A CONSEQUENCE-N relation is similar to a RESULT relation by suggests a more indirect linkage between the nucleus and satellite relative to the RESULT relation.

Example:
[<nucleus> There is such a maze of federal, state and local codes]
[<satellite> that building inspectors are backing].

Consequence-S

In a CONSEQUENCE-S mononuclear relation, the situation presented in the satellite is a consequence or result of the situation presented in the nucleus. The reader/writer intentions are irrelevant to determining whether such a relation holds. A CONSEQUENCE-S relation is similar to a CAUSE relation by suggests a more indirect linkage between the nucleus and satellite relative to the CAUSE relation.

Example:
[<nucleus> This hasn't been Kellogg Co.'s year. The oatbran craze has cost the world's largest cereal maker market share.] [<satellite> The company's president quit suddenly]

Disagreement

In a DISAGREEMENT mononuclear relation, the statement made in the satellite represents the speaker's disagreement with the statement made in the nucleus either with a single negative or a negation and restatement of the nucleus.

Example:
[<nucleus> You'd say Delaware has no right to object to that.]
MR. FARR: [<satellite> No, I would say it does have a right.]

Elaboration

In an ELABORATION mononuclear relation, the satellite provides specific information to help define a very general concept introduced in the nucleus.

Example:
[<nucleus> The projects are big.][<satellite> They can be C$1 billion plus.]

Elaboration-Additional

In an ELABORATION-ADDITIONAL mononuclear relation, the satellite gives additional information or detail about the situation presented in the nucleus. This relation is extremely common at all levels of the discourse structure.

Example:
[<nucleus> UNDER A PROPOSAL by Democrats to expand Individual Retirement Accounts, a $2,000 contribution by a taxpayer in the 33% bracket would save $330 on his taxes.] [<satellite> The savings was given incorrectly in Friday's edition.]

Elaboration-Process-Step

In an ELABORATION-PROCESS-STEP mononuclear relation, the nucleus introduces an activity or event (a process). The satellite then enumerates the steps involved in carrying out the process, usually in chronological order. The steps of the satellite are most often represented by a multinuclear SEQUENCE relationship.

Example:
[<nucleus> Montedison S. p. A. definitively agreed to buy all of the publicly held shares of Erbamont Nev. for $37 each. Montedison now owns about 72% of Erbamont's shares outstanding. The companies said the accord was unanimously approved by a special committee of Erbamont] [<satellite> Under the pact, Montedison will make a $37-a-share tender offer. The tender offer will be followed by the sale of all of Erbamont's assets, subject to all of its liabilities, to Montedison. Erbamont will then be liquidated, with any remaining Erbamont holders receiving a distribution of . . . ]

Evidence

In an EVIDENCE mononuclear relation, the situation presented in the satellite provides evidence or justification for the situation presented in the nucleus. Usually EVIDENCE relations pertain to actions and situations that are independent of the will of an animate agent. Evidence is data on which judgment of a conclusion may be based, and is presented by the writer or an agent in the article to convince the reader of a point. An evidence satellite increases the chance of the reader accepting the information presented in the nucleus.

Example:
[<nucleus> That system has worked.][<satellite> The standard of living has increased steadily over the past 40 years; more than 90% of the people consider themselves middle class.]

Evidence-Citation

In an EVIDENCE-CITATION mononuclear relation, the situation presented in the satellite provides evidence or justification for the situation presented in the nucleus. The evidence presented is derived from a particular text which is cited as the embodiment of the evidence.

Example:
[<nucleus> the State with jurisdiction would decide whether the wharf was consistent with State objectives, safety objectives, interference with navigation and so forth.]
JUSTICE ALITO: [<satellite> And Article VII says that each State on its own side of the river may continue to make conveyances of riparian rights.]

EXAMPLE

In an EXAMPLE mononuclear relation, the satellite provides an example with respect to the information presented in the nucleus.

Example:
[<nucleus> The offer in based on several conditions], [<satellite> including obtaining financing]

Explanation-Argumentative

In an EXPLANATION-ARGUMENTATIVE mononuclear relation, the satellite provides a factual explanation for the situation presented in the nucleus. It is not the intention of the writer to convince the reader of a point, which is the role of the EVIDENCE relation. It also differs from the REASON relation, which justifies or explains the actions of an animate agent, and involves the will or intentions of the agent.

Example:
[<nucleus> But their 1987 performance indicates that they won't abandon stocks unless conditions get far worse.] [<satellite> "Last time, we got rewarded for going out and buying stocks when the panic was the worst," said John W. Rogers, president of Chicago-based Ariel Capital Management Inc., which manages $1.1 billion of stocks."]

Hypothetical

In a HYPOTHETICAL mononuclear relation, the satellite presents a situation that is not factual, but that one supposes or conjectures to be true. The nucleus presents the consequences that would arise should the situation come true. A HYPOTHETICAL relation presents a more abstract scenario than a CONDITION relation.

Example:
[<satellite> Theoretically, the brokers will then be able to funnel "leads" on corporate finance opportunities to Kidder's investment bankers,][<nucleus> possibly easing the tension between the two camps]

Hypothetical-Answer

In a HYPOTHETICAL-ANSWER mononuclear relation, the satellite presents a situation that is not factual, but that one supposes or conjectures to be an answer to a proposed hypothetical question. The nucleus presents the consequences that would arise should the answer to the question posed as the situation come true. A HYPOTHETICAL_ANSWER relation is common to legal rhetoric but less common in other genres.

Example:
[<satellite> To determine whether or not a docking or wharfing in a navigable waterway of the United States would constitute a nuisance to . . .
JUSTICE GINSBURG: [<nucleus> But you're not talking about nuisance. You're talking about Delaware's environmental laws.]

Interpretation

In an INTERPRETATION mononuclear relation, the satellite gives a different perspective on the situation presented in the nucleus. It is subjective, presenting the personal opinion of the writer or of a third party. An interpretation can be: 1) an explanation of what is not immediately plain or explicit; 2) an explanation of actions, events, or statements by pointing out or suggesting inner relationships, motives, or by relating particulars to general principles; or 3) an understanding or appreciation of a situation in light of individual belief, judgment, interest, or circumstance.

Example:
[<nucleus> Even while they move outside their traditional tony circle, racehorse owners still try to capitalize on the elan of the sport. Glossy brochures circulated at racetracks gush about the limelight of the winner's circle and high-society schmoozing. One handout promises: "Pedigrees, parties, post times, parimutuels and pageantry."]
[<satellite> "It's just a matter of marketing and promoting ourselves," says Headley Bell, a fifth-generation horse breeder from Lexington.]

Manner

In a MANNER mononuclear relation, the satellite explains the way in which the nucleus is done. It can also express some sort of similarity/comparison. The satellite answers the question "in what manner?" or "in what way?" A MANNER relation is less "goal-oriented" than a MEANS relation, and often is more of a description of the style of an action.

Example:
Soon after the merger, moreover, Federal's management asked Tiger's pilots to sign an agreement stating [<nucleus> that they could be fired any time,] [<satellite> without cause or notice.]

Means

In a MEANS mononuclear relation, the satellite specifies a method, mechanism, instrument, channel or conduit for accomplishing some goal specified in the nucleus. It should tell you how something was or is to be accomplished. In other words, the satellite answers a "by which means?" or "how?" question that can be assigned to the nucleus. It is often indicated by the preposition by.

Example:
[<nucleus> Some underwriters have been pressing for years to tap the low-margin business][<satellite> by selling some policies directly to consumers].

Purpose

In a PURPOSE mononuclear relation, the situation presented in the satellite specifies a purpose of the nucleus, which is putative in nature, i.e., it is yet to be achieved. Most often it can be paraphrased as "nucleus in order to satellite."

Example:
[<nucleus> Bond Corp., a brewing, property, media and resources company is selling many of its assets] [<satellite> to reduce its debt].

Question-Answer

In a QUESTION_ANSWER relation, one span poses a question (not necessarily realized as an interrogative sentence), and the other span answers the question. The relation may be mononuclear or multinuclear, depending on the context. When the question is perceived as more important than the answer, the QUESTION_ANSWER relation is mononuclear whereby the question is assigned the role of nucleus and the answer is the satellite. In other examples, the QUESTION_ANSWER relation can be multinuclear whereby the question and answer spans are assigned as nuclei of the relation.

Example:
JUSTICE SCALIA: [<nucleus> But, normally, authority to wharf out doesn't convey the land with it; does it?]
MR. FARR: [<satellite> It conveys an interest in the land that allows the doing of the activity.]

Reason

A REASON relation involves a span that specifies an action carried out by an animate agent and a span that specifies a reason for the animate agent performing the action. The REASON relation can be both mononuclear and multinuclear. Where the action span is more important than the reason span, the nucleus is the action span and the Satellite is the reason span. can be paraphrased as "Satellite is the reason for Nucleus." Where both the action span and reason space are equally important, the action span and reason span are assigned as nuclei of the multinuclear REASON relation.

Example:
Earlier this year, DPC Acquisition made a $15-a-share offer for Dataproducts, [<nucleus> which the Dataproducts board said it rejected][<satellite> because the $283.7 million offer was not fully financed.]

Restatement

In a RESTATEMENT mononuclear relation, the satellite and nucleus are of (roughly) comparable size. The satellite reiterates the information presented in the nucleus, typically with slightly different wording. It does not add to or interpret the information.

Example:
CHIEF JUSTICE ROBERTS: [<nucleus> How do we split that difference?] I mean let's . . .
MR. FARR: Pardon me?
CHIEF JUSTICE ROBERTS: [<satellite> I mean, how do we decide the difference between those two cases?]

Result

In a RESULT mononuclear relation, the situation presented in the satellite is the cause of the situation presented in the nucleus. The result, which is the nucleus, is the most important part. Without presenting the satellite, the reader may not know what caused the result in the nucleus. The intention of the writer is to emphasize the result. The situation presented in the nucleus of a result relation is factual, i.e., it is achieved; in contrast to a PURPOSE relation where the nucleus is putative in nature. When the cause is the nucleus, the CAUSE relation is used.

Example:
[<nucleus> The explosions began][<satellite> when a seal blew out.]

Rhetorical-Question

In a RHETORICAL-QUESTION relation, the satellite poses a question vis-a-vis the nucleus; the intention of the author is usually not to answer it, but rather, to raise an issue for the reader to consider, or to raise an issue for which the answer should be obvious.

Example:
[<nucleus> For the long-term investor who picks stocks carefully, the price volatility can provide welcome buying opportunities as short-term players scramble frantically to sell stocks in a matter of minutes.] [<satellite> Who can make the better decision, the guy who has 10 seconds to decide what to do or the guy with all the time in the world]

Statement-Introduction

In a STATEMENT-INTRODUCTION mononuclear relation, a nucleus specifies a point for further elaboration. The nucleus is the beginning of a satellite that supports the point raised in the nucleus. The satellite can be a multinuclear relation that links a group of spans that support the nucleus.

Example:
MR. FREDERICK: Thank you, Mr. Chief Justice, and may it please the Court: Our position can be summarized in two words: [<nucleus> Boundaries matter.] [<satellite> Boundaries determine where States can make grants of land, and they determine where a State can exercise its police powers.]

Summary-S

In a SUMMARY-S mononuclear relation, the satellite summarizes the information presented in the nucleus. The emphasis is on the situation presented in the nucleus. The size of the summary (the satellite) is shorter than the size of the nucleus.

Example:
[<nucleus> The airline industry's fortunes, in dazzling shape for most of the year, have taken a sudden turn for the worse in the past few weeks. Citing rising fuel costs, promotional fare cuts and a general slowdown in travel, several major carriers have posted or are expected to post relatively poor third-quarter results . . . [<satellite> And they say the outlook for 1990 is nearly as bad.]

Summary-N

In a SUMMARY-N mononuclear relation, the nucleus summarizes the information presented in the satellite. The emphasis is on the summary. The size of the summary (the nucleus) is shorter than the size of the satellite.

Example:
[<satellite> The airline industry's fortunes, in dazzling shape for most of the year, have taken a sudden turn for the worse in the past few weeks. Citing rising fuel costs, promotional fare cuts and a general slowdown in travel, several major carriers have posted or are expected to post relatively poor third-quarter results . . . [<nucleus> And they say the outlook for 1990 is nearly as bad.]

Topic-Drift

The TOPIC-DRIFT relation links large spans where the topic drifts smoothly between the spans. This relation may be mononuclear or multinuclear. It is typically multinuclear with the related spans assigned as nuclei of the multinuclear TOPIC-DRIFT relation. It can also be mononuclear when the relative size or importance of one of the spans is less significant than that of the other. In this case, the larger span (or span with more importance) is the nucleus and the smaller span (or the span with less importance) is the satellite of the multinuclear TOPIC-DRIFT relation.

Example:
[<nucleus> Food and Drug Administration spokesman Jeff Nesbit said the agency has turned over evidence in a criminal investigation concerning Vitarine Pharmaceuticals Inc . . . ] [<nucleus> Mr. Nesbit also said the FDA has asked Bolar Pharmaceutical Co. to recall at the retail level its urinary tract antibiotic . . . ]

Other common mononuclear and multinuclear relations derived from RST theory can be used, such as the ENABLEMENT mononuclear relation, the EVALUATION mononuclear relation, the JOINT multinuclear relation, the LIST multinuclear relation, the SEQUENCE multinuclear relation and other rhetorical relations known in the computational linguistics field.

In the preferred embodiment, the ontology of the present invention also represents rhetorical relations between Document Segments derived from Speech Act Theory. Speech Act Theory analyzes utterances beyond even the situational semantics of their lexical content. In Speech Act Theory, the understanding of utterances involves sensitivity to the beliefs, goals and intentions of the speaker. Conventional notions of truth conditions do not apply easily to speech acts, although they have a place in dialogue analysis where arguments are being analyzed for propositional content (e.g. analysis of deposition texts, courtroom closing arguments, etc.). According to some early Speech Act Theory research (Austin 1962), so-called "truth independent" utterances should be classified as "performatives". These types of utterances can have "illocutionary force" or the ability for the utterance to have the status of a question (information-gathering device), promise, demand or other role which elicits a reaction in the listener. In 1969, Searle described and classified these performatives in the following way:

Representatives, which commit the speaker to the truth of the proposition expressed by the utterance;

Directives, which are attempts by the speaker to get the listener to perform some action;

Commissives, which commit the speaker to some future action (e.g. promising);

Expressives, which express a psychological state (e.g. thanking); and

Declarations, which effect the immediate changes in the institutional state of affairs (e.g. nominating, deciding, awarding).

In recent computational models of Speech Acts and dialogue (Groz and Sidner 1986, Carberry, 1990 inter alia), a discourse is thought to consist of three subcomponents:

The structure and sequence of utterances (the linguistic structure)

The purposes and goals of the participants (the intentional structure)

The structure of foci or topics in the discourse (the attentional structure)

Each of these elements can be considered a different computational task associated with a different type of data extraction technique. For example, the DAMSL (Dialogue Act Markup in Several Layers) markup system for dialogue tagging uses a tag set focused on the intentional structure of utterances rather than the linguistic or attentional structure of the utterances. DAMSL marked structures have been used for both task-oriented dialogue and non-task-oriented conversational speech. Some examples of DAMSL tags include "GREET", "CLARIFY", "FEEDBACK" and "DIGRESS" tags. Importantly, none of the DAMSL tags address the issue of the linguistic force of a text segment (independent of speaker intention) such as whether it is a conditional, hypothetical statement, reason, or purpose.

The following list describes relations derived from Speech Act theory, which are referred to as "Speech Act relations" herein for simplicity of description and can be identified as part of Speech Act tags in accordance with the present invention.

Establish_admission_of_knowledge relation;
Denial_of_knowledge relation;
Admission_of_knowledge relation;
Establish_admission_of_incriminating_knowledge relation;
Request_clarification relation;
Rephrase_establish_admission_of_incriminating_knowledge relation;
Broaden_scope_of_question_establish_incriminating_knowledge relation;
Establish_truth_of_statement relation;
Confirm_truth_of_statement relation;
Confirm_truth_on_contingency relation;
Deny_truth_of_statement relation;
Rephrase_establish_truth_of statement relation;
Confirm_denial_of_knowledge relation;
Request_for_Speculation relation;
Speculation relation;
Denial_of_speculation relation;
Objection relation;
Rephrase_denial_of_knowledge relation;
Confirm_denial_of_knowledge relation;

The Speech Act relations of the present invention are meant to expose a corresponding discourse strategy. In Deposition and Interview text, the overall scenario consists of two conflicting discourse strategies—one for the "interviewer" and one for the "interviewee". These could also be considered "offensive" vs. "defensive" strategies. The interviewer must elicit answers to questions which support a particular predefined conclusion. Typical conclusions are facts such as "This interviewee is guilty of a crime" or "This interviewee is unqualified for this job". The interviewee, in defense, must supply answers which prevent the conclusions from being reached.

The strategic designs fall into several categories. First, the interviewer must establish BASIC FACTS. These facts serve to support a very broad-scope theory of the knowledge of events in a case or perhaps skills in a job. The interviewer must establish this basic admission of knowledge on the part of the interviewee, or the interview will either TERMINATE or result in a CONTRADICTION (which amounts to the same thing in most cases). An example of a Speech Act relation for this purpose would be <establish admission of knowledge>. There are only two possible responses to this speech act, and only one response after which the dialogue may continue. That is, <denial of knowledge>, which will effectively end the dialogue, or <admission of knowledge> which will allow the interviewer to ask another question narrower in scope.

Following the establishment of basic knowledge of a set of facts, the interviewer will attempt to narrow the scope of the question in order to establish the admission of specific knowledge of an event or skill set on the part of the interviewee. The interviewer might alternatively want to clarify a set of facts or confirm that a previous quotation can be attributed to the interviewee. The Speech Act relation <establish admission of incriminating knowledge> is associated with text strings where the interviewer is seeking more specific knowledge of an event (this relation namespace would be changed for job interview text and only serves as an example here). And the relation <establish truth of statement> is used to confirm the attribution of a statement. The responses here are again "denial", which in this case will not end the dialogue, "confirmation", or a request for clarification or rephrase.

Aside from requesting the statement of facts and description of events, interviewers will often ask for opinions or speculations on the part of the interviewee. For this there is the <request for speculation> relation. Responses are either <speculation> or <denial of speculation> where the interviewee simply refuses to speculate.

Other Speech Act relations include "rephrases" of any of the requests for information, and "confirmation" of any stated facts. The <objection> Speech Act relation is used in the case of a formal objection on the part of interviewee's counsel. This is sometimes used in the same places where a <denial of speculation> relation might be found.

The Speech Act relations (and the Speech Act tags based thereon) are designed particularly for the information extraction system of the present invention in order to enable users to apply value judgments to various interrogation scenarios. It should be noted that this system does not supply any such value judgments but rather supplies data such that users can see the basic structure of interrogation strategies as they unfold. Moreover, the Speech Act relations as described herein can easily expose techniques such as broadening or narrowing of question scope, hedging, and rephrasing. The number of confirmations vs. denials can also be reviewed. In this manner, the Speech Act relations as part of the information extraction system of the present invention also affords the user a window into rhetorical subtlety that might otherwise be unavailable even by lengthy manual review.

Unlike rhetorical structure theory-based (RST) tags, the speech act tags discussed here are meant to identify the strategy of a dialogue, not the content of any given statement in that dialogue. As such, for certain types of source data, a data extraction tool employing Speech Act tags as described herein may be used as a complementary analysis tool as compared to such a tool employing RST tags.

In the preferred embodiment, relation variables and other ancillary information stored in the document repository 15 are derived by a relation tagging process that embeds tags within a given Document. The embedded tags are structured annotations that follow a predefined syntax for specifying Document Segments and rhetorical relations that are associated therewith as well as ancillary information pertaining to the given Document. In the preferred embodiment, the embedded tags are XML-type tags that conform to a predefined schema realized by a DTD, an XML schema or other suitable schema document. The tagging process can be carried out with the input of a trained operator in block 33 or by an automated process in block 35. In the preferred embodiment, the tags generated by the tagging process of block 33 and/or block 35 include the exemplary tags depicted in FIGS. 6A-6E.

The tag of FIG. 6A, referred to herein as a segment tag, includes a segment ID assigned to a given Document Segment, a start of segment indicator and an end of segment indicator that bounds the text of the given Document Segment, and optionally other attributes for the given Document Segment. An example segment tag is illustrated below.

<segment id="39"> May it please the court. Thank you, Your Honor, for the opportunity to practice before your court and for the court being willing to accommodate an emergency hearing in this case under these circumstances. We know that is an imposition on the court and appreciate the court's willingness to do so. With me today are also the plaintiffs, Bob Touchston and Diana Touchston and Debbie Shepperd, who are at the table immediately behind counsel.

The annotation <segment id="39"> encodes both the segment ID and the start of segment indicator. The annotation </segment> encodes the end of segment indicator. The text between the two annotations is the text of the Document Segment.

The tag of FIG. 6B, referred to herein as a span tag, includes a segment ID assigned to a given Document Segment, a start of segment indicator and an end of segment indicator that bounds the text of the given Document Segment, a span ID assigned to a given span, a type that is unique to the span tags for identifying the span tags from other type tags, an optional Actor name for the given span, an optional Actor role for the given span, and optional other attributes for the given span. A span tag is used to define a grouping of a given Document Segment defined by the segment ID/start of segment and end of segment and other Document Segments or spans. The span ID of the span tag, which is also referred to as a group ID, is shared by other span tags to encode the Document Segments that belong to a given span. An example span tag is illustrated below.

<segment id="47" parent="1462" relname="span"> to enjoin the state to extend that deadline, again, on information and belief, has been denied.</segment>

The annotation <segment id="47" . . . > encodes both the segment ID and the start of segment indicator of the given Document Segment. The annotation </segment> encodes the end of segment indicator. The text between these two annotations is the text of the Document Segment. The annotation parent="1462" is the span ID. The annotation relname="span" is a type that is unique to the span tags for identifying the span tags from other type tags. This exemplary tag groups the Document Segment (segment ID=47), which includes the text "to enjoin the state to extend that deadline, again, on information and belief, has been denied" into a span (span ID=1462) together with other Document Segments or spans that share the same span ID.

The tag of FIG. 6C, referred to herein as a Mononuclear RST tag, includes a Nucleus segment ID assigned to a given Nucleus Document Segment (or a nucleus span ID assigned to a given nucleus span or a Nucleus MNN assigned to a given nucleus MNN), a Satellite segment ID assigned to a given Document Segment (or a Satellite span ID assigned to a given Satellite span or a Satellite MNN ID assigned to a given satellite MNN), and a mononuclear RST relation type that uniquely corresponds to one of the mononuclear RST relations supported by the system. A Mononuclear RST tag is used to define a particular mononuclear RST relation (dictated by the mononuclear RST relation type) between the given Nucleus Document Segment (or span or MNN) and the given Satellite Document Segment or span or MNN). An example Mononuclear RST tag is illustrated below.

<group id="1462" type="span" parent="46" relname="purpose"/>

The annotation group id="1462" is the ID of the Nucleus segment, span or MNN. The annotation parent="46" is the ID of the Satellite segment, span or MNN. The annotation relname="purpose" dictates that the Purpose RST relation as described herein relates the Nucleus segment, span or MNN of the group ID "1462" to the Satellite segment, span or MNN of the parent ID "46". The annotation type="span" indicates that there is a connection from the Nucleus segment, span or MNN of ID "1462" to one or more other segments, spans, of MNNs of parent ID "46", which are encoded by span tags with the same relname and parent ID. Note that for a Nucleus span or Satellite span, the Nucleus span or Satellite span will be annotated by a Span tag with a "relname" equal to "span" as described above. Note that for a Nucleus MNN or Satellite MNN, the Nucleus MNN or Satellite MNN will be annotated by a Multinuclear RST tag as described herein with a type="multinuc" and the same parent ID. Also note that Document Segments that are not part of span (or MNN) can be part of a mononuclear relation as well. In this case, the Mononuclear RST tag does not have a span type—it has an annotation group ID, parent ID and relation name.

The tag of FIG. 6D, referred to herein as a Multinuclear RST tag, includes a segment ID assigned to a given Document Segment (or a Span ID assigned to a given span), a Multinuclear Node (MNN) ID assigned to a given MNN node, and a Multinuclear RST relation type that uniquely corresponds to one of the multinuclear RST relations supported by the system. A Multinuclear RST tag is used to join the given Document Segment or span to the given MNN node with a multinuclear relation dictated by the Multinuclear RST relation type. An example Multinuclear RST tag is illustrated below.

<group id="1540" type="multinuc" parent="300" relname="result"/>

The annotation group id="1468" is the ID of the given Document segment or span. The annotation parent="300" is the ID of the MNN. The annotation relname="result" dictates that the result RST relation as described herein relates the Document Segment (or span) of ID "1468" to the MNN node of ID 300. The annotation type="multinuc" indicates that this relation relates the Document Segment (or span) of the Group ID to multiple Document Segments (or spans), which is encoded by other Multinuclear RST tags that include the same relation and same parent ID.

The tag of FIG. 6E, referred to herein as a Speech Act tag, includes a segment ID assigned to a given Document Segment (or a span ID assigned to a given span) and a Speech Act relation type that uniquely corresponds to one of the Speech Act relations supported by the system. A Speech Act tag is used to associate a particular Speech Act relation (dictated by the Speech Act relation type) to the given Document Segment (or span). An example Speech Act tag is illustrated below.

<segment_id="1" relname="objection"/>

The annotation group id="1" is the ID of the given Document Segment or span. The annotation relname="objection" dictates that the "Objection" Speech Act relation as described herein relates to the given Document Segment or span. Speech Act segments do not have annotation types.

The tagging process can also embed document attribute tags in a document. Such tags can encode attribute data associated with a given document. The attribute data can represent a date (year/month/day). It can also vary for different types of Documents. For legal Documents, such attribute data can include a case number, docket number, court type, etc.

In the preferred embodiment, the tagging process of block 33 is carried out by an expert operator that is familiar with RST relation types and/or Speech Act relation types used by the system. The expert operator loads a Document into a computer-generated software application that facilitates identifying Document Segments and spans within the Document as well as associating mononuclear RST relations, multinuclear RST relations, and Speech Act relations with the Document Segments and spans as described above. An example of such a software application is the RSSTool freely available for download at wagsoft.com.

Figure 9B:
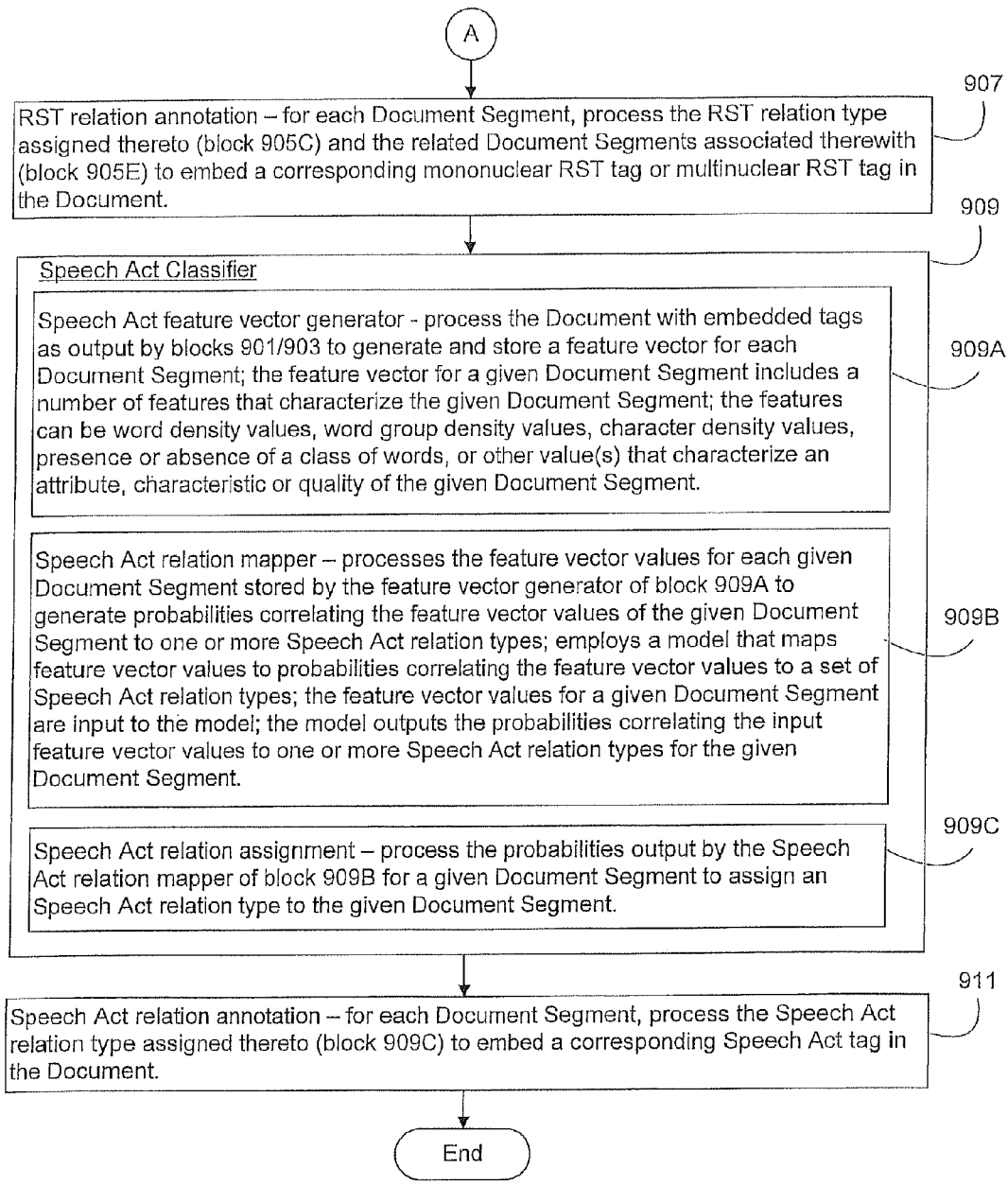

In the preferred embodiment, the automatic tagging process block 35 employs the operations illustrated in the flow chart of FIGS. 9A and 9B. Such operations begin in block 901 with segmentation of a given Document whereby the Document is parsed to identify Document Segments within the Document and assigns a unique Segments ID to each identified Document Segment. Segment tags are then embedded in the Document. Each segment tag annotates the start and end position of a Document Segment along with the segment ID assigned thereto and possibly other attributes (FIG. 6A).

In block 903, the Document is processed to attribute an actor to one or more Document Segments identified in block 901 (or Document Segment groups or Spans as described herein) and embed actor information (and possibly role information that describes the role the actor is playing in the associated discourse text) in the Segments tags or Span tags associated with such Document Segments or Spans (FIGS. 6A and 6B).

In block 905, the operations carry out RST classification that automatically assigns RST relation types to one or more Document Segments identified in block 901 (or Document Segment groups or Spans as described herein) and that automatically connects such Document Segments as part of mononuclear or multinuclear RST relation types as described herein. The operations of block 905 include sub-blocks 905A to 905E as described below.

In block 905A, a RST feature vector generator processes the Document with embedded tags as output by blocks 901 and 903 to generate and store a feature vector for each Document Segment. The feature vector for a given Document Segment includes a number of features that characterize the given Document Segment; the features can be word density values, word group density values, character density values, presence or absence of a class of words, or other value(s) that characterize an attribute, characteristic or quality of the given Document Segment.

In block 905B, an RST relation mapper processes the feature vector values for each given Document Segment stored by the feature vector generator of block 905A to generate probabilities correlating the feature vector values of the given Document Segment to one or more RST relation types. The RST relation mapper employs a model that maps feature vector values to probabilities correlating the feature vector values to a set of RST relation types. The feature vector values for a given Document Segment are input to the model. The model outputs the probabilities correlating the input feature vector values to one or more RST relation types for the given Document Segment.

In block 905C, the probabilities output by the RST relation mapper of block 905B for a given Document Segment are processed by decision logic that automatically assigns an RST relation type to the given Document Segment based upon such probabilities.

In block 905D, an RST connection mapper processes each Document Segment assigned an RST relation type in block 905C by analyzing the feature vector for Document Segment along with the respective feature vector of other Document Segments assigned with the same RST relation type. The feature vector pairs are processed to generate a probability correlating connection of the two respective Document Segments as part of a mononuclear or multinuclear type RST relation. The processing of the feature vector pairs employs a model that maps the feature vector pairs to probabilities correlating connection of the two Document Segments with feature vectors similar to the corresponding feature vector pairs of the model.

In block 905E, the probabilities output by the RST connection mapper of block 905D are processed by decision logic that automatically relates Document Segments as part of a mononuclear or multinuclear type RST relation.

In block 907, the operations process the RST relation types assigned to the Document Segments in block 905C and the related Document Segments connected to one another in block 905E to embed corresponding mononuclear RST tags or multinuclear RST tags in the Document (FIGS. 6C and 6D).

In block 909, the operations carry out Speech Act classification that automatically assigns Speech Act relation types to one or more Document Segments identified in block 901 (or Document Segment groups or Spans as described herein). The operations of block 909 include sub-blocks 909A to 909C as described below.

In block 909A, a Speech Act feature vector generator processes the Document with embedded tags as output by blocks 901 and 903 to generate and store a feature vector for each Document Segment. The feature vector for a given Document Segment includes a number of features that characterize the given Document Segment. The features can be word density values, word group density values, character density values, presence or absence of a class of words, or other value(s) that characterize an attribute, characteristic or quality of the given Document Segment. The features of the feature vector for classifying Speech Act relations are preferably different than the feature vectors for classifying RST relations; although there may be overlap therebetween. In the event that there is overlap, the overlapping calculations can be avoided in block 909A and employ the corresponding results generated in block 905A.

In block 909B, a Speech Act relation mapper processes the feature vector values for each given Document Segment stored by the feature vector generator of block 909A to generate probabilities correlating the feature vector values of the given Document Segment to one or more Speech Act relation types. The Speech Act relation mapper employs a model that maps feature vector values to probabilities correlating the feature vector values to a set of Speech Act relation types. The feature vector values for a given Document Segment are input to the model. The model outputs the probabilities correlating the input feature vector values to one or more Speech Act relation types for the given Document Segment.

In block 905C, the probabilities output by the Speech Act relation mapper of block 909B for a given Document Segment are processed by decision logic that automatically assigns a Speech Act elation type to the given Document Segment based upon such probabilities.

In block 911, the operations process the Speech Act relation types assigned to the Document Segments in block 909C to embed corresponding Speech Act tags in the Document (FIG. 6E).

Figure 7A:
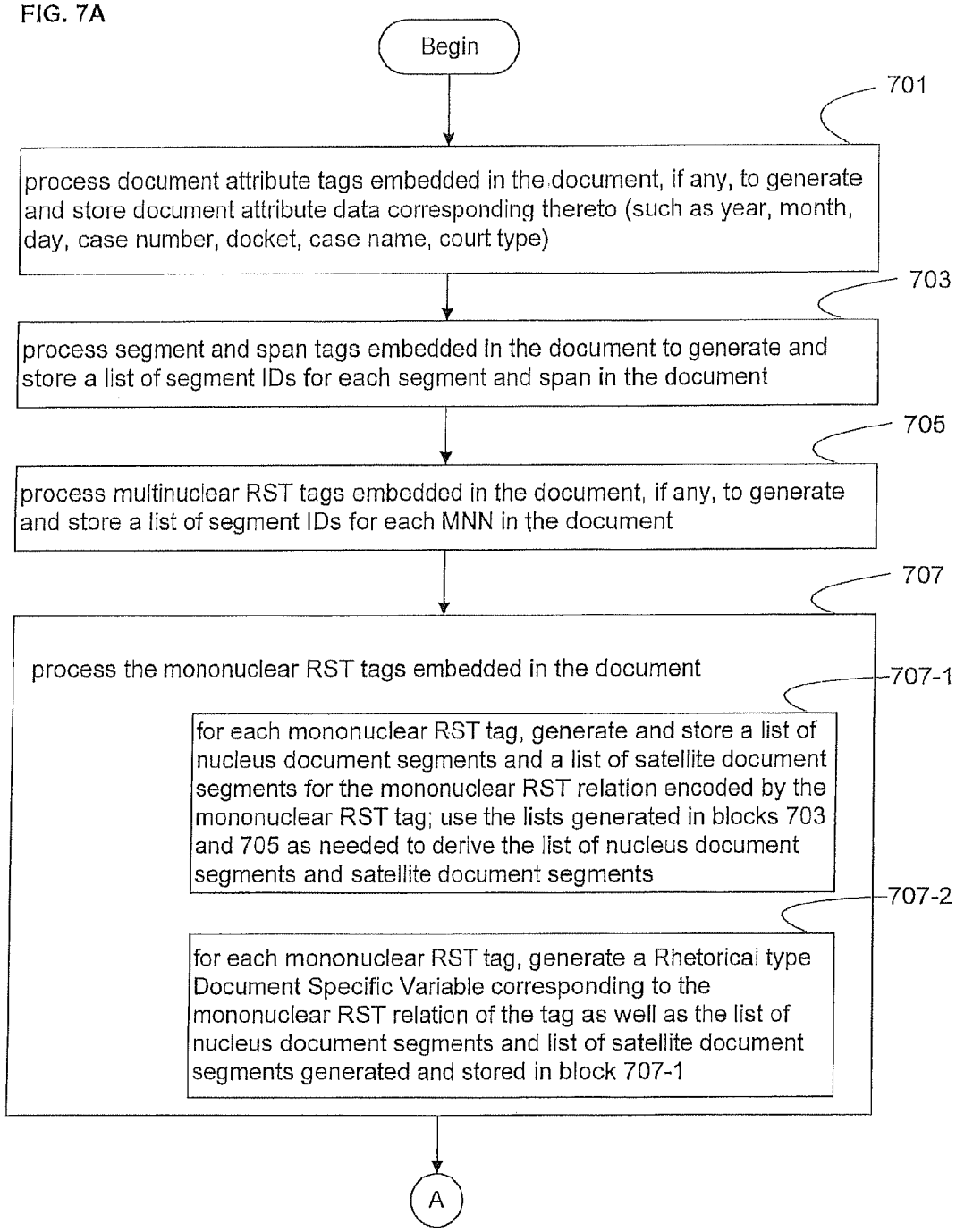
FIGS. 7A and 7B, collectively, is a flow chart illustrating exemplary operations carried out by the Document Tag Analyzer of FIG. 1 in accordance with the present invention.
Figure 7B:
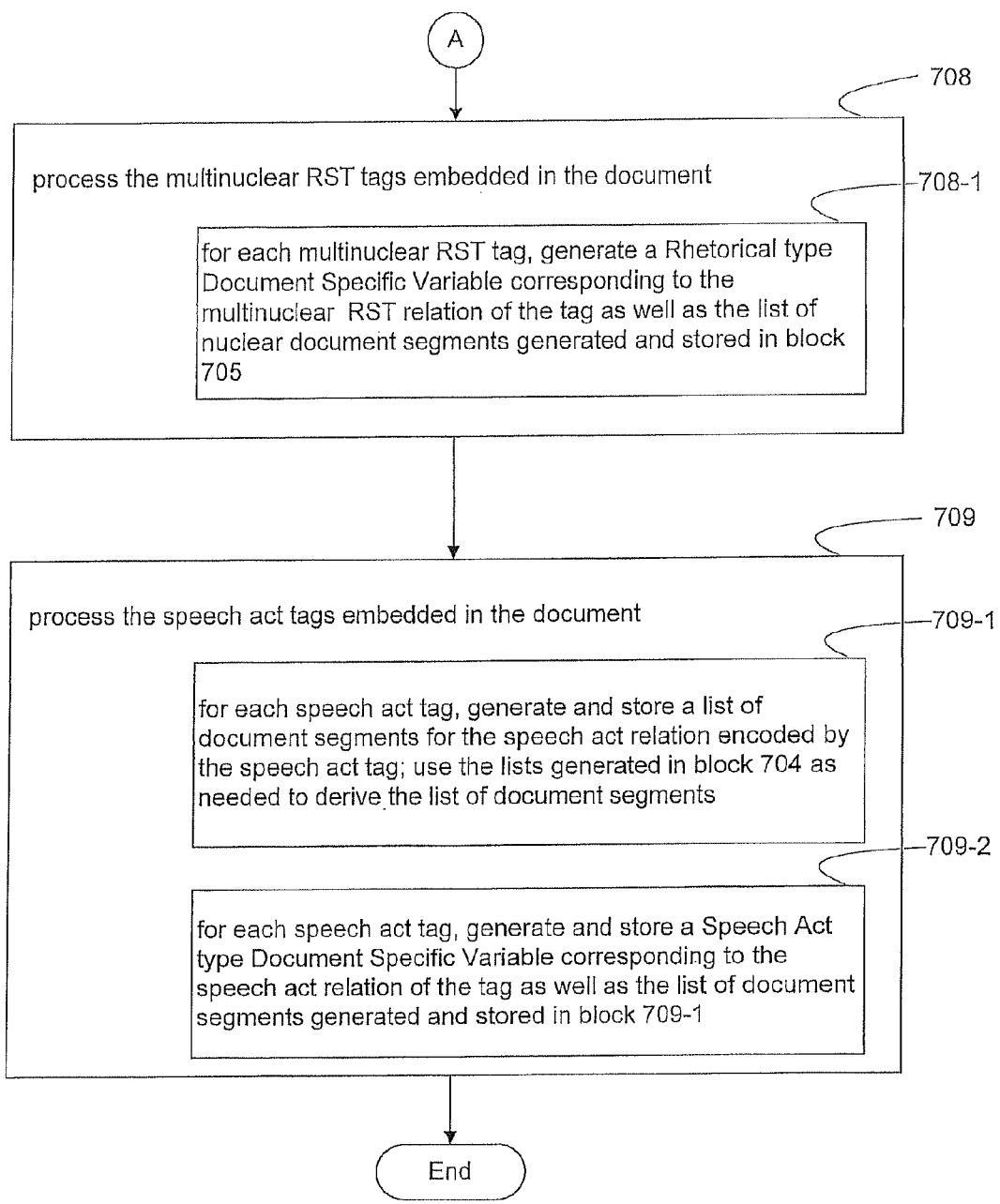

The Document (including the tags embedded therein by blocks 33 or 35) is processed by a Document Tag Analyzer 37 that transforms the embedded tags of the Document to corresponding relation variables as well as ancillary data pertaining to the Document. Exemplary operations carried out by the Document Tag Analyzer 37 are illustrated in FIGS. 7A and 7B. In block 701, document attribute tags embedded in the document, if any, are processed to generate and store document attribute data corresponding to the Document. In block 703, the segment and span tags embedded in the Document are process to generate and store a list of segment IDs for each segment and span in the Document. In block 705, the multinuclear RST tags embedded in the document are processed to generated and store a list of segment IDs for each MNN node in the Document.

Block 707 processes the mononuclear RST tags embedded in the Document and includes blocks 707-1 and 707-2. In block 707-1, each given mononuclear tag is processed to generate and store a list of nucleus Document Segments and a list of satellite Document Segments for the given mononuclear RST tag. The lists generated in blocks 703 and 705 are used as needed to derive the list of nucleus Document Segments and the list of satellite Document Segments. In block 707-2, a Rhetorical type Document Specific variable is generated corresponding to the mononuclear RST relation encoded by the given mononuclear RST tag as well as the lists of nucleus Document Segments and satellite Document Segments generated and stored in block 707-1.

Block 708 processes the multinuclear RST tags embedded in the Document. In block 708-1, each given multinuclear tag is processed to generate a Rhetorical type Document Specific variable corresponding to the multinuclear RST relation encoded by the given multinuclear RST tag as well as the list of nucleus Document Segments for the given multinuclear RST tag generated and stored in block 705.

Block 709 processes the Speech Act tags embedded in the Document and includes blocks 709-1 and 709-2. In block 709-1, each given Speech Act tag is processed to generate and store a list of Document Segments associated therewith. The list generated in blocks 703 and 705 are used as needed to derive this list of associated Document Segments. In block 709-2, a Speech Act type Document Specific variable is generated corresponding to the Speech Act relation encoded by the given Speech Act tag as well as the lists of Document Segments generated and stored in block 709-1.

Figure 8:
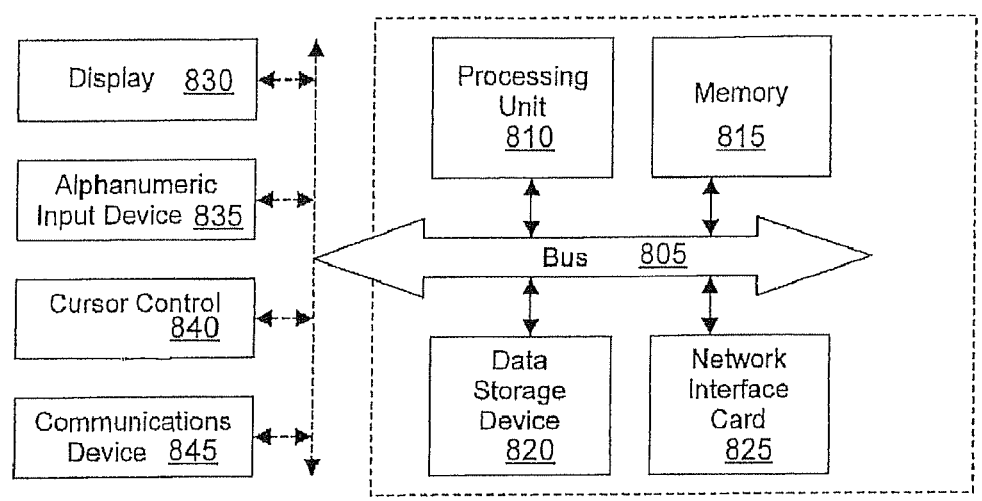
FIG. 8 is a functional block diagram of an exemplary computer system for realizing the present invention.

In an alternate embodiment, the system, methodology, and processes described herein can be run on a digital computer 800 as illustrated in FIG. 8. A data bus 805 allows communication between a central processing unit 810, random access volatile memory 815, a data storage device 820, and a network interface card 825. Input from the user is permitted through an alphanumeric input device 835 and cursor control system 840, and data is made visible to the user via a display 830. Communication between the computer and other networked devices is made possible via a communications device 845.

It will be appreciated by those of ordinary skill in the art that any configuration of the system may be used for various purposes according to the particular implementation. The control logic or software implementing the present invention can be stored in the main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communication in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 810. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital sounds, etc.).

The methodologies, systems and apparatus of the present invention provide for information extraction whereby pieces of information are extracted from individual texts according to user supplied search parameters. Such information extraction functionality is significantly different than document retrieval functionality whereby a list of documents are retrieved according to user supplied search parameters. In the ideal case, the users of the information extraction functionality of the present invention have several important qualities:

They are very familiar with the source material;
They have specific questions; and
They want a result set that contains parts of documents, not the documents themselves—they don't want to spend time reading through documents.

The ideal users for document retrieval products, on the other hand, have different qualities:

They tend to be unfamiliar with the source material or have no particular source material in mind;
They have general questions; and
They want a result set that includes documents that they can read through to determine relevance to their needs.

With such distinctions in mind, the methodologies, systems and apparatus of the present invention the product design can be tailored for a specific market where there are expert users in search of specific information, either separate pieces of text or pieces of text taken as a whole to show trends in the textual data. In this manner, the present invention can save these users time while providing accurate and useful information at a glance.

Figure 10:
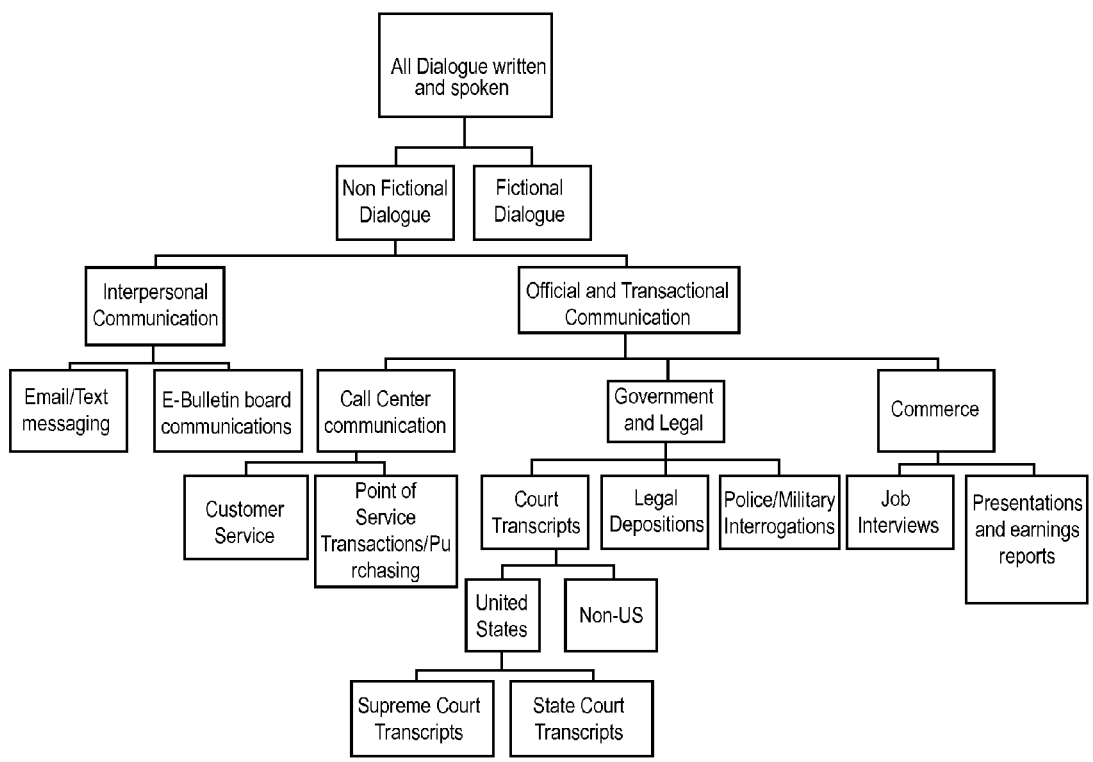
FIG. 10 is a schematic diagram illustrating different types of spoken and written dialogues.

For example, it is contemplated that the present invention can enable a user to seek trends in the textual data. Such textual data can include many different types of non-fictional dialog as illustrated in FIG. 10. These different types of non-fictional dialogues have interlocutors with different roles and hence the variables in each type of dialogue will change accordingly as will the goal of the entire exchange. For example, in a customer service exchange there are typically two participants with the roles CUSTOMER and AGENT. The GOAL of the exchange is for the set of customer TASKS to be exhausted. For example, a typical task is REQUEST PRODUCT SERVICE CALL. Several sub-exchanges must take place to accomplish this. The agent must acquire information about the product name and product problem before scheduling a service call. To schedule the service call, the agent must acquire customer contact information and assign a call time. This sort of information has been extracted from actual exchanges for the purposes of building automated agents in customer service centers. The quality of such systems however will only be as good as the categorization of the sub exchanges in typical dialogues. If just one step is missed, the exchange will never reach its goal. Information extraction in both customer service and purchasing exchanges has traditionally been for creating better automated agents, and not designed for end users. One type of end user who might benefit from such information would be service center training staff, but systems specifically designed for these end users are not in wide use.

Dialogues in the area of Commerce and Finance range from recorded job interviews to recorded board meetings to oral presentations and reports. All these situations are very different from the call center exchanges, although there are a few similarities. In the job interview, for example, there are typically two participants—an INTERVIEWER and an INTERVIEWEE. The goal of the exchange is for the set of interviewer tasks to be exhausted, much like the goal of the agent in the call center exchange. However, the dynamic between the participants is fundamentally different. There is not necessarily the implied cooperation in a job interview exchange the way there is in the call center because individual participant goals are often in conflict. This means that every sub-exchange has a value for each participant and each participant will struggle to maximize that value. For example the interviewer wants to glean enough information about the interviewee to either eliminate him as a candidate or identify him as the best candidate. The interviewee wants to glean enough information about the interviewer to know which answers best qualify him to be identified as "best candidate". Conversation in interviews often involves HEDGING—to turn a perceived BAD fact into a perceived GOOD fact, POSITIVE REINFORCEMENT and ELABORATION to turn a perceived NEUTRAL fact into a GOOD fact, and AGREEMENT to show SOLIDARITY with interviewer. Although there are no information extraction systems currently created to extract interview dialogue using variables like these, such systems could certainly be of value to companies assessing their workforce quality and attempting to screen better for better results.

Multi-party exchanges, such as those which occur at board meetings represent still other types of dialogue features. In these cases each participant has a COMPANY ROLE and each company role is part of a COMPANY HIERARCHY. These roles determine not just when the participant will speak but often what the participant will speak about or for how long. Meetings also have a pre-determined flow of dialogue known informally as an "agenda". The agenda represents both the order of topics for discussion and the goal of the dialogue—invariably to solve a problem or make a decision as a group. Dialogue elements in meetings serve only two purposes—to CONTRIBUTE INFORMATION to facilitate the decision or to CONTRIBUTE OPINIONS to facilitate the decision. Because of the hierarchical nature of roles, opinions and information will not be contributed in equal amounts by all parties. No information systems currently exist to extract meeting data which might relate Roles, Contribution Types and points on a meeting Agenda, but such a system could clearly be useful. Company management could tell which parties contributed what sorts of information and which contributions helped the most in achieving the goal of making a decision.

There have been described and illustrated herein several embodiments of a data extraction methodology and system that relates rhetorical information to document segments. While particular embodiments of the invention have been described, it is not intended that the invention be limited thereto, as it is intended that the invention be as broad in scope as the art will allow and that the specification be read likewise. Thus, while particular automated operations have been disclosed for relating rhetorical classifications to document segments, it will be appreciated that other automated operations can be used as well. In addition, while particular types of computer systems have been disclosed for realizing the system, it will be understood that other computer systems can be used as well. Also, while preferred database structures and document variables have been disclosed, it will be understood that database structures and document variables can be similarly used. Moreover, while particular RST relational types and Speech Act relation types have been disclosed, it will be appreciated that other RST relational types, other Speech Act relational types and/or other rhetorical relations could be used as well. The methodology, system and apparatus of the present invention provide for extraction of text from a set of text documents in an efficient and accurate manner suitable for a range of expert domains, which include for example, legal research and analysis, scientific research and analysis, and journalist research and analysis, financial research and analysis, business research and analysis, FDA Administrative Panel, transcript research, job interviewing as an indicator of future success, interrogation evaluation, etc. It will therefore be appreciated by those skilled in the art that yet other modifications could be made to the provided invention without deviating from its spirit and scope as claimed.

We claim:

1. A method for extraction of text from a set of text documents, the method comprising the steps of:
  a) identifying a plurality of document segments within a given text document;
  b) for each given document segment identified in a), generating and storing at least one structured annotation embedded within the document and associated with the given segment, the at least one structured annotation specifying the start and end of the given document segment and a rhetorical relation associated with the given segment;
  c) processing the structured annotations generated and stored in b) to generate a plurality of variables that represent document segments and associated rhetorical relations as specified by the structured annotations;
  d) storing the variables generated in c) in a repository;
  e) receiving query input from a user that specifies at least one rhetorical relation of interest; and
  f) in response to receipt of said query input, querying the variables stored in the repository to identify zero or more document segments that are associated with a rhetorical relation that matches the at least one rhetorical relation of interest specified by said query input for output to the user.

2. A method according to claim 1, wherein:
the rhetorical relations include a set of RST relations whose meaning is dictated by nuclearity of the associated text.

3. A method according to claim 2, wherein:
said set of RST relations includes a plurality of mononuclear RST relations each having a nucleus and a satellite.

4. A method according to claim 2, wherein:
said set of RST relations include a plurality of multinuclear RST relations each having a plurality of nucleus.

5. A method according to claim 1, wherein:
the rhetorical relations include a set of Speech Act relations whose meaning extends beyond the situational semantics of the associated text.

6. A method according to claim 1, wherein:
said at least one structured annotation generated and stored in b) is an XML tag.

7. A method according to claim 1, wherein:
the repository include first and second sets of variables, said first set of variables representing document segments specified by the structured annotations generated and stored in b), and said second set of variables representing rhetorical relations specified by the structured annotations generated and stored in b) and linked to variables of the first set.

8. A method according to claim 1, wherein:
the repository stores ancillary data linked to a given text document; the query input received from the user specifies ancillary data of interest; and the querying of f) filters the matched document segments to identify those document segments belonging to a text document linked to ancillary data corresponding to the ancillary data of interest.

9. A method according to claim 1, wherein:
the repository stores variables representing one of an actor and role and linked to document segments;
the query input received from the user specifies an actor or role of interest; and
the querying of f) filters the matched document segments to identify those document segments linked to variables representing an actor or role corresponding to the actor or role of interest.

10. A method according to claim 1, wherein:
the query input received from the user specifies additional search terms; and
the querying of f) filters the matched document segments to identify those document segments that satisfy the additional search terms.

11. A method according to claim 10, wherein:
the additional search terms comprise one or more key word terms.

12. A method according to claim 1, wherein:
the query input received from the user specifies a goal or need of the user; and the method further comprising analyzing matched document segments in accordance with the goal or need specified by the user and outputting the results of such analysis to the user.

13. A method according to claim 1, wherein:
the query input received from the user specifies at least one sorting parameter; and
the method further comprises sorting the matched documents in accordance with the at least one sort parameter specified by the query input and outputting the results in order as sorted to the user.

14. A method according to claim 1, wherein:
the operations of a) and b) are performed by an automated tool or at least in part by a human operator.

15. A method according to claim 1, further comprising:
presenting output of the querying to a user in a view that presents document segments that are connected to a particular document segment by a relation of interest.

16. A system for extraction of text from a set of text documents comprising:
text document annotation means for identifying a plurality of document segments within a given text document and, for each given document segment, generating and storing at least one structured annotation embedded within the document and associated with the given segment, the at least one structured annotation specifying the start and end of the given document segment and a rhetorical relation associated with the given segment;

annotation processing means for processing the structured annotations generated and stored by the text document annotation means to generate a plurality of variables that represent document segments and associated rhetorical relations as specified by the structured annotations;

a repository storing the variables generated by the annotation processing means; user input query means for receiving query input from a user that specifies at least one rhetorical relation of interest; and query processing logic, operably coupled to the user input query means and the repository, that utilizes said query input to query the variables stored in the repository to identify zero or more document segments that are associated with a rhetorical relation that matches the at least one rhetorical relation of interest specified by said query input for output to the user.

17. A system according to claim 16, wherein:
the rhetorical relations include a set of RST relations whose meaning is dictated by nuclearity of the associated text.

18. A system according to claim 17, wherein:
said set of RST relations includes a plurality of mononuclear RST relations each having a nucleus and a satellite.

19. A system according to claim 17, wherein:
said set of RST relations include a plurality of multinuclear RST relations each having a plurality of nucleus.

20. A system according to claim 16, wherein:
the rhetorical relations include a set of Speech Act relations whose meaning extends beyond the situational semantics of the associated text.

21. A system according to claim 16, wherein:
said at least one structured annotation generated and stored by the text document annotation means is an XML tag.

22. A system according to claim 16, wherein:
the repository include first and second sets of variables, said first set of variables representing document segments specified by the structured annotations generated and stored by the text document annotation means, and said second set of variables representing rhetorical relations specified by the structured annotations generated and stored by the text document annotation means and linked to variables of the first set.

23. A system according to claim 16, wherein:
the repository stores ancillary data linked to a given text document; the query input received by the user input query means specifies ancillary data of interest; and
the query processing logic filters the matched document segments to identify those document segments belonging to a text document linked to ancillary data corresponding to the ancillary data of interest.

24. A system according to claim 16, wherein:
the repository stores variables representing one of an actor and role and linked to document segments;
the query input received by the user input query means specifies an actor or role of interest; and
the query processing logic filters the matched document segments to identify those document segments linked to variables representing an actor or role corresponding to the actor or role of interest.

25. A system according to claim 16, wherein:
the query input received by the user input query means specifies additional search terms; and the query processing logic filters the matched document segments to identify those document segments that satisfy the additional search terms.

26. A system according to claim 25, wherein:
the additional search terms comprise one or more key word terms.

27. A system according to claim 16, wherein:
the query input received from the user specifies a goal or need of the user; and the system further comprises result presentation logic for analyzing matched document segments in accordance with the goal or need specified by the user and outputting the results of such analysis to the user.

28. A system according to claim 16, wherein:
the query input received from the user specifies at least one sorting parameter; and
the query processing logic sorts the matched documents in accordance with the at least one sort parameter specified by the query input and outputs the results in order as sorted to the user.

29. A system according to claim 16, wherein:
the text document annotation means comprises an automated tool or carries out operations that are performed at least in part by a human operator.

30. A system according to claim 16, wherein:
the user input query means and query processing logic are realized by a server coupled to users over a network.

31. A system according to claim 16, wherein:
the user input query means and query processing logic are realized by a computer processing system accessible by one or more users.

32. A system according to claim 16, further comprising:
result presentation logic for presenting output of the query processing logic to a user in a view that presents document segments that are connected to a particular document segment by a relation of interest.

\* \* \* \* \*